(12) United States Patent
Huang

(10) Patent No.: US 12,372,754 B2
(45) Date of Patent: Jul. 29, 2025

(54) OPTICAL LENS ASSEMBLY AND A PHOTOGRAPHING MODULE

(71) Applicant: NEWMAX TECHNOLOGY CO., LTD., Taichung (TW)

(72) Inventor: Ching-Yun Huang, Taichung (TW)

( * ) Notice: Subject to any disclaimer, the term of this patent is extended or adjusted under 35 U.S.C. 154(b) by 463 days.

(21) Appl. No.: 17/971,643

(22) Filed: Oct. 24, 2022

(65) Prior Publication Data

US 2024/0053585 A1 Feb. 15, 2024

(30) Foreign Application Priority Data

Aug. 10, 2022 (TW) ................... 111129972

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC ....... G02B 9/64; G02B 13/16; G02B 13/0045
See application file for complete search history.

(56) References Cited

U.S. PATENT DOCUMENTS

| | | | |
|---|---|---|---|
| 2019/0235213 A1* | 8/2019 | Lin | G02B 13/0045 |
| 2019/0353874 A1* | 11/2019 | Yeh | G02B 13/0045 |
| 2021/0048629 A1* | 2/2021 | Kuo | G02B 26/004 |

* cited by examiner

*Primary Examiner* — Mariam Qureshi
(74) *Attorney, Agent, or Firm* — Bruce Stone LLP; Joseph A. Bruce

(57) ABSTRACT

An optical lens assembly includes, in order from an object side to an image side: a first lens with negative refractive power; a second lens with negative refractive power; a third lens with positive refractive power; a stop; a fourth lens with positive refractive power; a fifth lens with negative refractive power; and a sixth lens with positive refractive power. Half of a maximum field of view of the optical lens assembly is HFOV, an entrance pupil diameter of the optical lens assembly is EPD, a distance from an object-side surface of the first lens to an image plane along an optical axis is TL, a central thickness of the fifth lens along the optical axis is CT5, a radius of curvature of an image-side surface of the fifth lens is R10. Following conditions are satisfied: 3.81 deg.<HFOV*EPD/TL<6.24 deg. and $-1.9 \text{ mm}^2 < CT5*R10 < -0.2 \text{ mm}^2$.

20 Claims, 11 Drawing Sheets

OPTICAL LENS ASSEMBLY AND A PHOTOGRAPHING MODULE

BACKGROUND

Field of the Invention

The present invention relates to an optical lens assembly and a photographing module, and more particularly to an optical lens assembly and a photographing module applicable to electronic products.

Description of Related Art

Small camera lens devices can be widely used in various electronic devices, such as, wearable display, smart phone, tablet computer, game player, dashcam, surveillance camera and so on. With the emergence of the concept of metaverse, small camera lens devices used in wearable displays can combine the virtual world with the real world to provide new horizons and experiences. Therefore, how to develop a small camera lens device to have a large field of view, be workable in both the visible and infrared light bands, and adapt to a large temperature range while being applied to virtual reality (VR) and augmented reality (AR) is the motivation of the present invention.

SUMMARY

The objective of the present invention is to provide an optical lens assembly and a photographing module, and the optical lens assembly has a total of six lenses with refractive power, whereby when a specific condition is satisfied, the optical lens assembly of the present invention has the image quality with high image resolution in both visible and infrared light bands, and can achieve ultra-wide field of view and reduce the influence of ambient temperature on image quality.

In addition, when the lens is made of glass, the optical lens assembly of the present invention can be used at more extreme temperatures.

Therefore, an optical lens assembly in accordance with the present invention includes, in order from an object side to an image side: a first lens with negative refractive power, including an object-side surface and an image-side surface, the object-side surface of the first lens being convex in a paraxial region thereof, the image-side surface of the first lens being concave in a paraxial region thereof, and the first lens being made of glass; a second lens with negative refractive power, including an object-side surface and an image-side surface, the image-side surface of the second lens being concave in a paraxial region thereof, and one of the object-side surface and the image-side surface of the second lens being aspheric; a third lens with positive refractive power, including an object-side surface and an image-side surface, the image-side surface of the third lens being convex in a paraxial region thereof, and one of the object-side surface and the image-side surface of the third lens being aspheric; a stop; a fourth lens with positive refractive power, including an object-side surface and an image-side surface, the object-side surface of the fourth lens being convex in a paraxial region thereof, the image-side surface of the fourth lens being convex in a paraxial region thereof, and one of the object-side surface and the image-side surface of the fourth lens being aspheric; a fifth lens with negative refractive power, including an object-side surface and an image-side surface, the object-side surface of the fifth lens being concave in a paraxial region thereof, the image-side surface of the fifth lens being convex in a paraxial region thereof, and one of the object-side surface and the image-side surface of the fifth lens being aspheric; and a sixth lens with positive refractive power, including an object-side surface and an image-side surface, the object-side surface of the sixth lens being convex in a paraxial region thereof, the image-side surface of the sixth lens being concave in a paraxial region thereof, and one of the object-side surface and the image-side surface of the sixth lens being aspheric, wherein half of a maximum field of view of the optical lens assembly is HFOV, an entrance pupil diameter of the optical lens assembly is EPD, a distance from the object-side surface of the first lens to an image plane along an optical axis is TL, a central thickness of the fifth lens along the optical axis is CT5, a radius of curvature of the image-side surface of the fifth lens is R10, and the following conditions are satisfied: 3.81 deg.<HFOV*EPD/TL<6.24 deg. and $-1.9$ mm$^2$<CT5*R10<$-0.2$ mm$^2$.

Optionally, the optical lens assembly has a total of six lenses with refractive power.

The present invention has the following effect. When 3.81 deg.<HFOV*EPD/TL<6.24 deg. is satisfied, a better space arrangement of the optical lens assembly and a better ratio of and the field of view and the entrance pupil value can be obtained, so as to provide a wider field of view and large aperture. When $-1.9$ mm$^2$<CT5*R10<$-0.2$ mm$^2$ is satisfied, the distribution of the refractive power of the system is be more appropriate, which is favorable to correcting the system aberration for the enhancement of the image quality. When the first lens is made of glass, the optical lens assembly of the present invention can be used at more extreme temperatures.

Optionally, a focal length of the optical lens assembly is f, a focal length of the first lens is f1, and the following condition is satisfied: $-0.46$<f/f1<$-0.09$, so that the ratio of the focal length of the first lens to that of the optical lens assembly can enhance the wide-field of view characteristic of the optical lens assembly, so as to provide a larger field of view.

Optionally, the focal length of the optical lens assembly is f, a focal length of the fifth lens is f5, and the following condition is satisfied: $-0.99$<f/f5<$-0.43$, so that the ratio of the focal length of the fifth lens to that of the optical lens assembly can reduce the high-order aberration, so as to enhance the image quality.

Optionally, the focal length of the first lens is f1, a focal length of the second lens is f2, a focal length of the third lens is f3, and the following condition is satisfied: 0.99 mm<f1*f2/f3<2.84 mm, which is favorable to enlarging the field of view of the lens device and providing enough amount of incident light.

Optionally, a central thickness of the first lens along the optical axis is CT1, a central thickness of the second lens along the optical axis is CT2, a central thickness of the third lens along the optical axis is CT3, and the following condition is satisfied: 1.30<(CT1+CT2)/CT3<2.58, so that the ratio of the thicknesses of the lenses is more appropriate, which is favorable to the wide-field of view characteristic and the lens manufacturability.

Optionally, the distance from the object-side surface of the first lens to the image plane along an optical axis is TL, a maximum image height of the optical lens assembly is IMH, and the following condition is satisfied: 2.27<TL/(IMH*2)<3.56, so that the height of the optical lens assembly and the aspect ratio of the image are more appropriate to achieve the ultra-wide field of view and the appropriate module height.

Optionally, a distance from the image-side surface of the sixth lens to the image plane along the optical axis is BFL, the maximum image height of the optical lens assembly is IMH, and the following condition is satisfied: 0.55<BFL/IMH<1.13, so that the rear focal space and the aspect ratio of the image are more appropriate, which is favorable to the cooperation of the incident angle of the chief ray and an image sensor.

Optionally, an Abbe number of the fourth lens is vd4, an Abbe number of the fifth lens is vd5, and the following condition is satisfied: 28.5<vd4−vd5<44.1, so that the arrangement of the lenses can correct the aberration of the optical lens assembly, so as to enhance the image quality.

Optionally, the focal length of the optical lens assembly is f, a radius of curvature of the object-side surface of the first lens is R1, a radius of curvature of the image-side surface of the first lens is R2, and the following condition is satisfied: 1.20 mm<f*(R1/R2)<4.16 mm, so that the ratio of the curvatures of the lenses is better to reduce the difficulty in manufacturing glass lenses. Optionally, a focal length of the fourth lens is f4, a focal length of the sixth lens is f6, a central thickness of the fourth lens along the optical axis is CT4, a central thickness of the sixth lens along the optical axis is CT6, and the following condition is satisfied: 0.66 mm<f4*f6/(CT4+CT6)<1.89 mm, so that the thicknesses and refractive powers of the lenses are better to enhance the image quality and reduce the lens tolerance.

Optionally, a radius of curvature of the object-side surface of the fourth lens is R7, a radius of curvature of the image-side surface of the fourth lens is R8, and the following condition is satisfied: −2.20<R7/R8<−1.04, so that the ratio of the curvatures of the lenses is better to reduce the system aberration.

Optionally, the focal length of the third lens is f3, the focal length of the fourth lens is f4, the central thickness of the third lens along the optical axis is CT3, the central thickness of the fourth lens along the optical axis is CT4, and the following condition is satisfied: 0.22<f3*CT3/(f4*CT4)<0.48, so that the thicknesses and refractive powers of the lenses are better to enhance the image quality and reduce the lens tolerance.

Optionally, the focal length of the optical lens assembly is f, the focal length of the fourth lens is f4, the focal length of the fifth lens is f5, the focal length of the sixth lens is f6, and the following condition is satisfied: −1.19 mm$^{-2}$<f/(f4*f5*f6)<−0.27 mm$^{-2}$, so that the ratio of the refractive power of the optical lens assembly is better to reduce the image distortion of the optical lens assembly.

Optionally, the focal length of the second lens is f2, the focal length of the third lens is f3, and the following condition is satisfied: −1.51<f2/f3<−0.43, so that the distribution of the refractive power of the optical lens assembly is appropriate, which is favorable to maintaining a wide field of view and enhancing the relative illuminance of the optical lens assembly.

Optionally, the focal length of the third lens is f3, the focal length of the fourth lens is f4, and the following condition is satisfied: 1.89<f3/f4<3.66, so that the distribution of the refractive power of the system is more appropriate, which is favorable to correcting the system aberration to enhance the image quality.

Optionally, the focal length of the fifth lens is f5, a focal length of the sixth lens is f6, and the following condition is satisfied: −0.70<f5/f6<−0.37, so that the distribution of the refractive power of the optical lens assembly is more appropriate, whereby the optical lens assembly can be applied in both the visible and infrared light bands.

Optionally, the focal length of the optical lens assembly is f, and the following condition is satisfied: 0.45 mm<f<0.68 mm. Optionally, the focal length of the first lens is f1, and the following condition is satisfied: −5.27 mm<f1<−1.17 mm. Optionally, the focal length of the second lens is f2, and the following condition is satisfied: −3.72 mm<f2<−0.78 mm. Optionally, a maximum field of view of the optical lens assembly is FOV, and the following condition is satisfied: 160 deg.<FOV<253.32 deg.

Moreover, a photographing module in accordance with the present invention includes a lens barrel, an optical lens assembly disposed in the lens barrel, and an image sensor disposed on an image plane of the optical lens assembly. The optical lens assembly includes, in order from an object side to an image side: a first lens with negative refractive power, including an object-side surface and an image-side surface, the object-side surface of the first lens being convex in a paraxial region thereof, the image-side surface of the first lens being concave in a paraxial region thereof, and the first lens being made of glass material; a second lens with negative refractive power, including an object-side surface and an image-side surface, the image-side surface of the second lens being concave in a paraxial region thereof, and one of the object-side surface and the image-side surface of the second lens being aspheric; a third lens with positive refractive power, including an object-side surface and an image-side surface, the image-side surface of the third lens being convex in a paraxial region thereof, and one of the object-side surface and the image-side surface of the third lens being aspheric; a stop; a fourth lens with positive refractive power, including an object-side surface and an image-side surface, the object-side surface of the fourth lens being convex in a paraxial region thereof, the image-side surface of the fourth lens being convex in a paraxial region thereof, and one of the object-side surface and the image-side surface of the fourth lens being aspheric; a fifth lens with negative refractive power, including an object-side surface and an image-side surface, the object-side surface of the fifth lens being concave in a paraxial region thereof, the image-side surface of the fifth lens being convex in a paraxial region thereof, and one of the object-side surface and the image-side surface of the fifth lens being aspheric; and a sixth lens with positive refractive power, including an object-side surface and an image-side surface, the object-side surface of the sixth lens being convex in a paraxial region thereof, the image-side surface of the sixth lens being concave in a paraxial region thereof, and one of the object-side surface and the image-side surface of the sixth lens being aspheric, wherein half of a maximum field of view of the optical lens assembly is HFOV, an entrance pupil diameter of the optical lens assembly is EPD, a distance from the object-side surface of the first lens to the image plane along an optical axis is TL, a central thickness of the fifth lens along the optical axis is CT5, a radius of curvature of the image-side surface of the fifth lens is R10, and the following conditions are satisfied: 3.81 deg.<HFOV*EPD/TL<6.24 deg. and −1.9 mm$^2$<CT5*R10<−0.2 mm$^2$.

Therefore, when 3.81 deg.<HFOV*EPD/TL<6.24 deg. is satisfied, a better space arrangement of the optical lens assembly and a better ratio of and the field of view and the entrance pupil value can be obtained, so as to provide a wider field of view and large aperture. When −1.9 mm$^2$<CT5*R10<−0.2 mm$^2$ is satisfied, the distribution of the refractive power of the system is be more appropriate, which is favorable to correcting the system aberration for the enhancement of the image quality. When the first lens is made of glass, the optical lens assembly of the present invention can be used at more extreme temperatures.

Optionally, the optical lens assembly has a total of six lenses with refractive power.

Optionally, a focal length of the optical lens assembly is f, a focal length of the first lens is f1, and the following condition is satisfied: $-0.46<f/f1<-0.09$, so that the ratio of the focal length of the first lens to that of the optical lens assembly can enhance the wide-field of view characteristic of the optical lens assembly, so as to provide a larger field of view.

Optionally, the focal length of the optical lens assembly is f, a focal length of the fifth lens is f5, and the following condition is satisfied: $-0.99<f/f5<-0.43$, so that the ratio of the focal length of the fifth lens to that of the optical lens assembly can reduce the high-order aberration, so as to enhance the image quality.

Optionally, the focal length of the first lens is f1, a focal length of the second lens is f2, a focal length of the third lens is f3, and the following condition is satisfied: $0.99 \text{ mm}<f1*f2/f3<2.84 \text{ mm}$, which is favorable to enlarging the field of view of the lens device and providing enough amount of incident light.

Optionally, a central thickness of the first lens along the optical axis is CT1, a central thickness of the second lens along the optical axis is CT2, a central thickness of the third lens along the optical axis is CT3, and the following condition is satisfied: $1.30<(CT1+CT2)/CT3<2.58$, so that the ratio of the thicknesses of the lenses is more appropriate, which is favorable to the wide-field of view characteristic and the lens manufacturability.

Optionally, the distance from the object-side surface of the first lens to the image plane along an optical axis is TL, a maximum image height of the optical lens assembly is IMH, and the following condition is satisfied: $2.27<TL/(IMH*2)<3.56$, so that the height of the optical lens assembly and the aspect ratio of the image are more appropriate to achieve the ultra-wide field of view and the appropriate module height.

Optionally, a distance from the image-side surface of the sixth lens to the image plane along the optical axis is BFL, the maximum image height of the optical lens assembly is IMH, and the following condition is satisfied: $0.55<BFL/IMH<1.13$, so that the rear focal space and the aspect ratio of the image are more appropriate, which is favorable to the cooperation of the incident angle of the chief ray and an image sensor.

Optionally, an Abbe number of the fourth lens is vd4, an Abbe number of the fifth lens is vd5, and the following condition is satisfied: $28.5<vd4-vd5<44.1$, so that the arrangement of the lenses can correct the aberration of the optical lens assembly, so as to enhance the image quality.

Optionally, the focal length of the optical lens assembly is f, a radius of curvature of the object-side surface of the first lens is R1, a radius of curvature of the image-side surface of the first lens is R2, and the following condition is satisfied: $1.20 \text{ mm}<f*(R1/R2)<4.16 \text{ mm}$, so that the ratio of the curvatures of the lenses is better to reduce the difficulty in manufacturing glass lenses.

Optionally, a focal length of the fourth lens is f4, a focal length of the sixth lens is f6, a central thickness of the fourth lens along the optical axis is CT4, a central thickness of the sixth lens along the optical axis is CT6, and the following condition is satisfied: $0.66 \text{ mm}<f4*f6/(CT4+CT6)<1.89$ mm, so that the thicknesses and refractive powers of the lenses are better to enhance the image quality and reduce the lens tolerance.

Optionally, a radius of curvature of the object-side surface of the fourth lens is R7, a radius of curvature of the image-side surface of the fourth lens is R8, and the following condition is satisfied: $-2.20<R7/R8<-1.04$, so that the ratio of the curvatures of the lenses is better to reduce the system aberration.

Optionally, the focal length of the third lens is f3, the focal length of the fourth lens is f4, the central thickness of the third lens along the optical axis is CT3, the central thickness of the fourth lens along the optical axis is CT4, and the following condition is satisfied: $0.22<f3*CT3/(f4*CT4)<0.48$, so that the thicknesses and refractive powers of the lenses are better to enhance the image quality and reduce the lens tolerance.

Optionally, the focal length of the optical lens assembly is f, the focal length of the fourth lens is f4, the focal length of the fifth lens is f5, the focal length of the sixth lens is f6, and the following condition is satisfied: $-1.19 \text{ mm}^{-2}<f/(f4*f5*f6)<-0.27 \text{ mm}^{-2}$, so that the ratio of the refractive power of the optical lens assembly is better to reduce the image distortion of the optical lens assembly.

Optionally, the focal length of the second lens is f2, the focal length of the third lens is f3, and the following condition is satisfied: $-1.51<f2/f3<-0.43$, so that the distribution of the refractive power of the optical lens assembly is appropriate, which is favorable to maintaining a wide field of view and enhancing the relative illuminance of the optical lens assembly.

Optionally, the focal length of the third lens is f3, the focal length of the fourth lens is f4, and the following condition is satisfied: $1.89<f3/f4<3.66$, so that the distribution of the refractive power of the system is more appropriate, which is favorable to correcting the system aberration to enhance the image quality.

Optionally, the focal length of the fifth lens is f5, a focal length of the sixth lens is f6, and the following condition is satisfied: $-0.70<f5/f6<-0.37$, so that the distribution of the refractive power of the optical lens assembly is more appropriate, whereby the optical lens assembly can be applied in both the visible and infrared light bands.

Optionally, the focal length of the optical lens assembly is f, and the following condition is satisfied: $0.45 \text{ mm}<f<0.68 \text{ mm}$. Optionally, the focal length of the first lens is f1, and the following condition is satisfied: $-5.27 \text{ mm}<f1<-1.17 \text{ mm}$. Optionally, the focal length of the second lens is f2, and the following condition is satisfied: $-3.72 \text{ mm}<f2<-0.78 \text{ mm}$. Optionally, a maximum field of view of the optical lens assembly is FOV, and the following condition is satisfied: $160 \text{ deg.}<FOV<253.32 \text{ deg.}$ The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
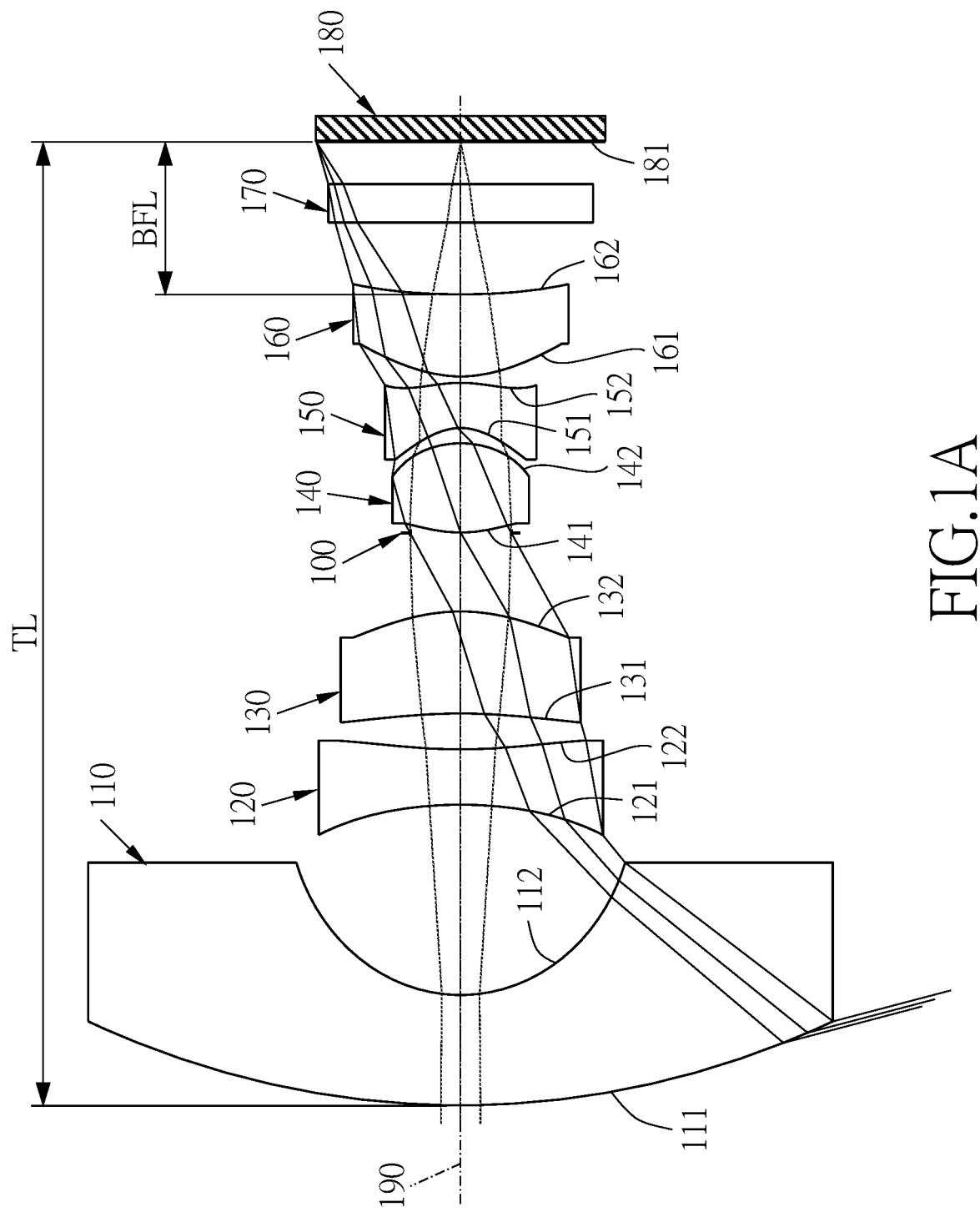
FIG. 1A shows a schematic view of an optical lens assembly in accordance with a first embodiment of the present invention.
Figure 1B:
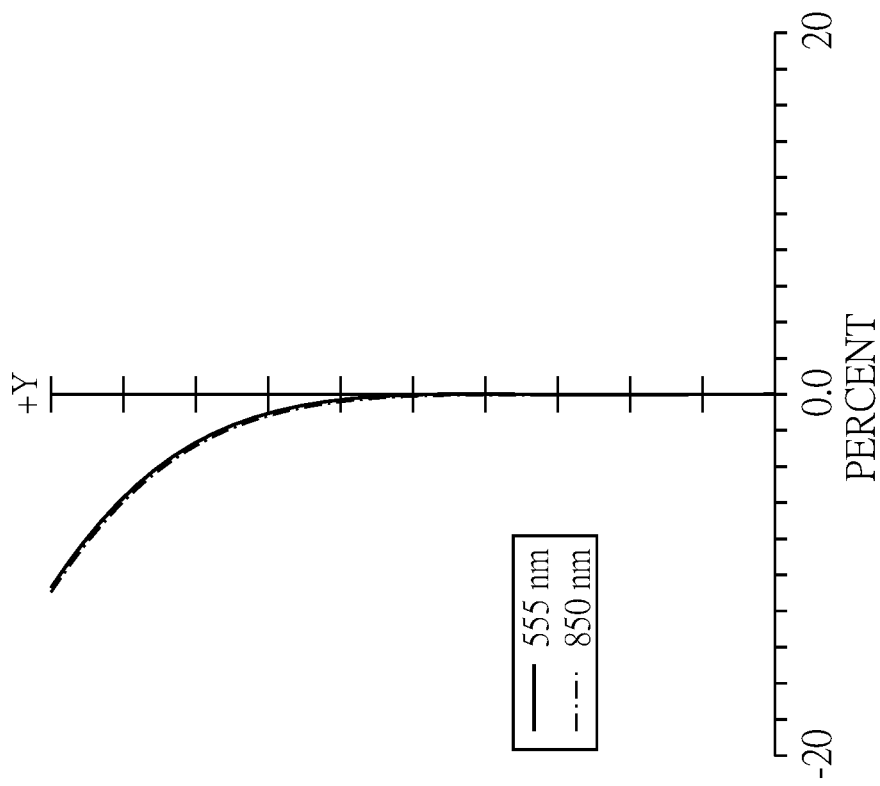
FIG. 1B shows, in order from left to right, the field curvature curve and the distortion curve of the first embodiment of the present invention, which illustrate the states of the field curvature curve and the distortion curve in both visible and infrared light bands.
Figure 1B:
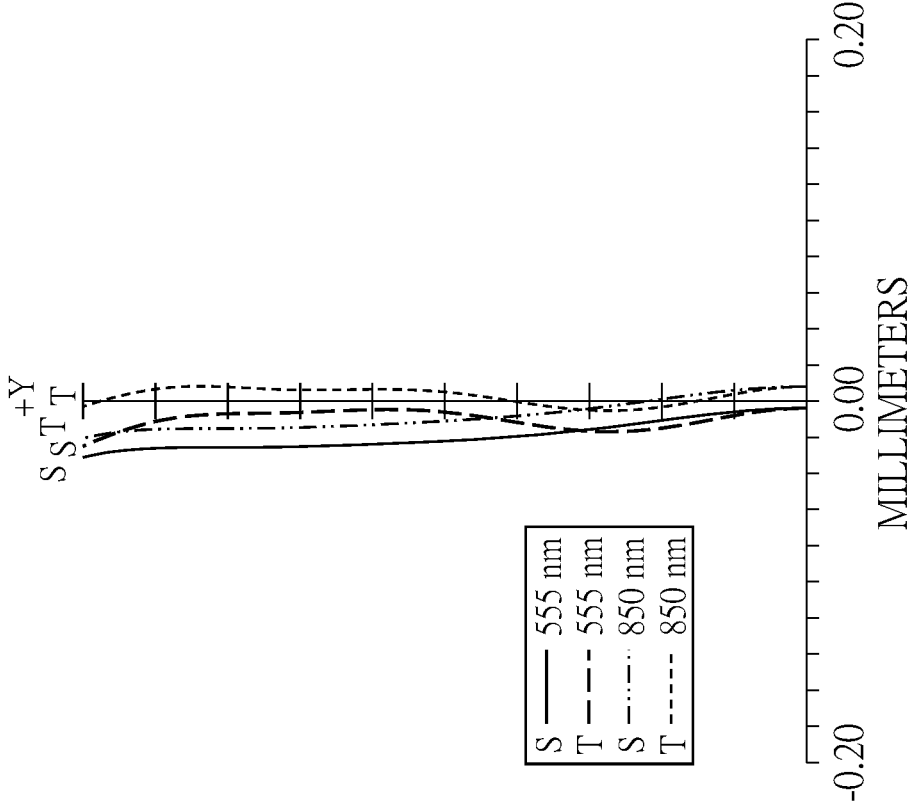

Referring to FIGS. 1A and 1B, FIG. 1A shows a schematic view of an optical lens assembly in accordance with a first embodiment of the present invention, and FIG. 1B shows, in order from left to right, the field curvature curve and the distortion curve of the first embodiment of the present invention, which illustrate the states of the field curvature curve and the distortion curve in both visible and infrared light bands. As shown in FIG. 1A, the optical lens assembly includes, in order from an object side to an image side along an optical axis 190: a first lens 110, a second lens 120, a third lens 130, a fourth lens 140, a fifth lens 150, a sixth lens 160, a filter 170, and an image plane 181. The optical lens assembly can cooperate with an image sensor 180 disposed on the image plane 181. The optical lens assembly has a total of six lenses with refractive power, but not limited thereto.

The first lens 110 with negative refractive power includes an object-side surface 111 and an image-side surface 112, the object-side surface 111 of the first lens 110 is convex in a paraxial region thereof (near the optical axis 190), the image-side surface 112 of the first lens 110 is concave in a paraxial region thereof, and the first lens 110 is made of glass.

The second lens 120 with negative refractive power includes an object-side surface 121 and an image-side surface 122, the object-side surface 121 of the second lens 120 is concave in a paraxial region thereof, the image-side surface 122 of the second lens 120 is concave in a paraxial region thereof, the object-side surface 121 and the image-side surface 122 of the second lens 120 are aspheric, and the second lens 120 is made of plastic.

The third lens 130 with positive refractive power includes an object-side surface 131 and an image-side surface 132, the object-side surface 131 of the third lens 130 is concave in a paraxial region thereof, the image-side surface 132 of the third lens 130 is convex in a paraxial region thereof, the object-side surface 131 and the image-side surface 132 of the third lens 130 are aspheric, and the third lens 130 is made of plastic.

The fourth lens 140 with positive refractive power includes an object-side surface 141 and an image-side surface 142, the object-side surface 141 of the fourth lens 140 is convex in a paraxial region thereof, the image-side surface 142 of the fourth lens 140 is convex in a paraxial region thereof, the object-side surface 141 and the image-side surface 142 of the fourth lens 140 are aspheric, and the fourth lens 140 is made of plastic.

The fifth lens 150 with negative refractive power includes an object-side surface 151 and an image-side surface 152, the object-side surface 151 of the fifth lens 150 is concave in a paraxial region thereof, the image-side surface 152 of the fifth lens 150 is convex in a paraxial region thereof, the object-side surface 151 and the image-side surface 152 of the fifth lens 150 are aspheric, and the fifth lens 150 is made of plastic.

The sixth lens 160 with positive refractive power includes an object-side surface 161 and an image-side surface 162, the object-side surface 161 of the sixth lens 160 is convex in a paraxial region thereof, the image-side surface 162 of the sixth lens 160 is concave in a paraxial region thereof, the object-side surface 161 and the image-side surface 162 of the sixth lens 160 are aspheric, and the sixth lens 160 is made of plastic.

The filter 170 is made of glass, is located between the sixth lens 160 and the image plane 181, and has no influence on the focal length of the optical lens assembly. In the present embodiment, the filter 170 is selected from filters that allow light in the visible light wavelengths (for example, but not limited to, the reference wavelength 555 nm), in the infrared light wavelengths (for example, but not limited to, the reference wavelength 850 nm) or in both the visible and infrared light wavelengths to pass therethrough.

The curve equation for the aspheric surface profiles of the respective lenses of the first embodiment is expressed as follows:

$$z(h) = \frac{ch^2}{1+[1-(k+1)c^2h^2]^{0.5}} + \sum (A_i) \cdot (h^i)$$

wherein:
z represents the value of a reference position at a height of h with respect to a vertex of the surface of a lens along the optical axis 190;
c represents a paraxial curvature (i.e. a curvature of a lens surface in a paraxial region thereof) equal to 1/R (R: a paraxial radius of curvature);
h represents a vertical distance from the point on the curve of the aspheric surface to the optical axis 190;
k represents the conic constant; and
$A_i$ represents the ith-order aspheric coefficient.

In the first embodiment of the optical lens assembly, a focal length of the optical lens assembly is f, a f-number of the optical lens assembly is Fno, a maximum field of view of the optical lens assembly is FOV, an entrance pupil diameter of the optical lens assembly is EPD, and their values are expressed as follows: f=0.55 mm, Fno=2.25, FOV=206.4 deg. and EPD=0.24 mm.

In the first embodiment of the optical lens assembly, half of the maximum field of view of the optical lens assembly is HFOV, the entrance pupil diameter of the optical lens assembly is EPD, a distance from the object-side surface 111 of the first lens 110 to the image plane 181 along the optical axis 190 is TL, a central thickness of the fifth lens 150 along the optical axis 190 is CT5, a radius of curvature of the image-side surface 152 of the fifth lens 150 is R10, and the following conditions are satisfied: HFOV*EPD/TL=4.79 deg. and CT5*R10=−0.26 mm$^2$.

In the first embodiment of the optical lens assembly, the focal length of the optical lens assembly is f, a focal length of the first lens 110 is f1, and the following condition is satisfied: f/f1=−0.32.

In the first embodiment of the optical lens assembly, the focal length of the optical lens assembly is f, a focal length of the fifth lens 150 is f5, and the following condition is satisfied: f/f5=−0.54.

In the first embodiment of the optical lens assembly, the focal length of the first lens 110 is f1, a focal length of the second lens 120 is f2, a focal length of the third lens 130 is f3, and the following condition is satisfied: f1*f2/f3=2.02 mm.

In the first embodiment of the optical lens assembly, a central thickness of the first lens 110 along the optical axis 190 is CT1, a central thickness of the second lens 120 along the optical axis 190 is CT2, a central thickness of the third lens 130 along the optical axis 190 is CT3, and the following condition is satisfied: (CT1+CT2)/CT3=1.62.

In the first embodiment of the optical lens assembly, the distance from the object-side surface 111 of the first lens 110 to the image plane 181 along the optical axis 190 is TL, a maximum image height of the optical lens assembly is IMH, and the following condition is satisfied: TL/(IMH*2)=2.97.

In the first embodiment of the optical lens assembly, a distance from the image-side surface 162 of the sixth lens 160 to the image plane 181 along the optical axis 190 is BFL, the maximum image height of the optical lens assembly is IMH, and the following condition is satisfied: BFL/IMH=0.94.

In the first embodiment of the optical lens assembly, an Abbe number of the fourth lens 140 is vd4, an Abbe number of the fifth lens 150 is vd5, and the following condition is satisfied: vd4−vd5=35.63.

In the first embodiment of the optical lens assembly, the focal length of the optical lens assembly is f, a radius of curvature of the object-side surface 111 of the first lens 110 is R1, a radius of curvature of the image-side surface 112 of the first lens 110 is R2, and the following condition is satisfied: f*(R1/R2)=3.03 mm.

In the first embodiment of the optical lens assembly, a focal length of the fourth lens 140 is f4, a focal length of the sixth lens 160 is f6, a central thickness of the fourth lens 140 along the optical axis 190 is CT4, a central thickness of the sixth lens 160 along the optical axis 190 is CT6, and the following condition is satisfied: f4*f6/(CT4+CT6)=1.58 mm.

In the first embodiment of the optical lens assembly, a radius of curvature of the object-side surface 141 of the fourth lens 140 is R7, a radius of curvature of the image-side surface 142 of the fourth lens 140 is R8, and the following condition is satisfied: R7/R8=−1.38.

In the first embodiment of the optical lens assembly, the focal length of the third lens 130 is f3, the focal length of the fourth lens 140 is f4, the central thickness of the third lens 130 along the optical axis 190 is CT3, the central thickness of the fourth lens 140 along the optical axis 190 is CT4, and the following condition is satisfied: f3*CT3/(f4*CT4)=0.29.

In the first embodiment of the optical lens assembly, the focal length of the optical lens assembly is f, the focal length of the fourth lens 140 is f4, the focal length of the fifth lens 150 is f5, the focal length of the sixth lens 160 is f6, and the following condition is satisfied: f/(f4*f5*f6)=−0.37 mm$^{-2}$.

In the first embodiment of the optical lens assembly, the focal length of the second lens 120 is f2, the focal length of the third lens 130 is f3, and the following condition is satisfied: f2/f3=−1.20.

In the first embodiment of the optical lens assembly, the focal length of the third lens 130 is f3, the focal length of the fourth lens 140 is f4, and the following condition is satisfied: f3/f4=3.05.

In the first embodiment of the optical lens assembly, the focal length of the fifth lens 150 is f5, the focal length of the sixth lens 160 is f6, and the following condition is satisfied: f5/f6=−0.58.

The detailed optical data of the respective elements in the optical lens assembly of the first embodiment is shown in Table 1, and the aspheric surface data of the lenses in the first embodiment is shown in Table 2.

TABLE 1

Embodiment 1
f(focal length) = 0.55 mm, Fno = 2.25, FOV = 206.4 deg.

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 5.864 | 0.596 | glass | 1.804 | 46.5 | −1.69 |
| 2 | | 1.055 | 1.031 | | | | |
| 3 | Second lens | −2.822 (ASP) | 0.301 | plastic | 1.544 | 56.0 | −3.10 |
| 4 | | 4.371 (ASP) | 0.194 | | | | |
| 5 | Third lens | −4.110 (ASP) | 0.553 | plastic | 1.661 | 20.4 | 2.58 |
| 6 | | −1.278 (ASP) | 0.426 | | | | |
| 7 | Stop | infinity | 0.002 | | | | |
| 8 | Fourth lens | 0.991 (ASP) | 0.483 | plastic | 1.544 | 56.0 | 0.85 |
| 9 | | −0.717 (ASP) | 0.083 | | | | |
| 10 | Fifth lens | −0.370 (ASP) | 0.245 | plastic | 1.661 | 20.4 | −1.01 |
| 11 | | −1.044 (ASP) | 0.033 | | | | |
| 12 | Sixth lens | 0.840 (ASP) | 0.445 | plastic | 1.544 | 56.0 | 1.73 |

TABLE 1-continued

Embodiment 1
f(focal length) = 0.55 mm, Fno = 2.25, FOV = 206.4 deg.

| Surface | | Curvature Radius | Thickness/gap | Material | Refractive Index (nd) | Abbe number (vd) | Focal length |
|---|---|---|---|---|---|---|---|
| 13 | | 6.227 (ASP) | 0.389 | | | | |
| 14 | Filter | infinity | 0.210 | glass | 1.517 | 64.2 | |
| 15 | | infinity | 0.230 | | | | |
| 16 | Image plane | infinity | — | | | | |

TABLE 2

Aspheric Coefficients

| Surface | 1 | 2 | 3 | 4 | 5 | 6 |
|---|---|---|---|---|---|---|
| K:   | 0.0000E+00 | 0.0000E+00 | 1.5546E+00 | −9.4965E+00 | 4.9217E+00 | −8.4301E+00 |
| A2:  | 0.0000E+00 | 0.0000E+00 | 0.0000E+00 | 0.0000E+00 | 0.0000E+00 | 0.0000E+00 |
| A4:  | 0.0000E+00 | 0.0000E+00 | −3.6500E−02 | −6.4188E−03 | 8.7901E−02 | −2.1800E−01 |
| A6:  | 0.0000E+00 | 0.0000E+00 | −3.0788E−03 | −3.2724E−03 | −1.1158E−01 | 3.1888E−01 |
| A8:  | 0.0000E+00 | 0.0000E+00 | 5.2414E−04 | −1.3766E−01 | 5.4672E−02 | −1.7723E−01 |
| A10: | 0.0000E+00 | 0.0000E+00 | −8.8869E−03 | 3.1552E−02 | 5.4672E−02 | 1.7963E−01 |
| A12: | 0.0000E+00 | 0.0000E+00 | −1.5042E−04 | −1.4494E−04 | 1.6568E−01 | 1.2743E−01 |
| A14: | 0.0000E+00 | 0.0000E+00 | 0.0000E+00 | 0.0000E+00 | 3.1501E−02 | 2.5264E−01 |
| A16: | 0.0000E+00 | 0.0000E+00 | 0.0000E+00 | 0.0000E+00 | −3.6645E−01 | −6.5487E−01 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K:   | −3.3224E+01 | −7.2118E+00 | −4.1148E+00 | −6.2746E+00 | −3.1108E+00 | −9.6476E+01 |
| A2:  | 0.0000E+00 | 0.0000E+00 | 0.0000E+00 | 0.0000E+00 | 0.0000E+00 | 0.0000E+00 |
| A4:  | 3.6129E+00 | −4.0540E+00 | −5.0678E+00 | 1.0163E+00 | −4.3853E−01 | 2.8679E−01 |
| A6:  | −4.0974E+01 | 1.6932E+01 | 5.7842E+01 | 6.4101E+00 | 3.2906E+00 | −8.3672E−01 |
| A8:  | 3.0826E+02 | −9.0792E+01 | −3.5108E+02 | −2.5724E+01 | −1.1381E+01 | 2.7184E+00 |
| A10: | −1.5031E+03 | 1.8355E+02 | 8.5863E+02 | 2.7314E+01 | 1.9198E+01 | −2.3493E+00 |
| A12: | 2.6945E+03 | −1.1482E+02 | −1.7244E+02 | 2.0168E+01 | −5.3601E+00 | −7.9629E+00 |
| A14: | −1.3776E+04 | −1.1900E+03 | 1.0680E+02 | 2.3754E+02 | −3.3342E+01 | 8.7772E+00 |
| A16: | 1.7618E+04 | 2.9230E+03 | 1.4001E+03 | −2.0027E+02 | 4.2216E+01 | 7.3375E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

In Table 1, the units of the radius of curvature, the thickness, the gap and the focal length are expressed in mm, and the surface numbers 0-16 respectively represent the surfaces sequentially arranged from the object-side to the image-side along the optical axis, wherein the surface 0 represents a gap between an object and the object-side surface 111 of the first lens 110 along the optical axis 190, the surface 1 represents the central thickness of the first lens 110 along the optical axis 190, the surface 3 represents the central thickness of the second lens 120 along the optical axis 190, the surface 5 represents the central thickness of the third lens 130 along the optical axis 190, the surface 8 represents the central thickness of the fourth lens 140 along the optical axis 190, the surface 10 represents the central thickness of the fifth lens 150 along the optical axis 190, the surface 12 represents the central thickness of the sixth lens 160 along the optical axis 190, the surface 14 represents the central thickness of the filter 170 along the optical axis 190, the surface 2 represents a gap between the first lens 110 and the second lens 120 along the optical axis 190, the surface 4 represents a gap between the second lens 120 and the third lens 130 along the optical axis 190, the surface 6 represents a gap between the third lens 130 and the stop 100 along the optical axis 190, the surface 7 represents a gap between the stop 100 and the object-side surface 141 of the fourth lens 140 along the optical axis 190, which is expressed as a positive value since the stop 100 is closer to the object-side than the object-side surface 141 of the fourth lens 140, the surface 9 represents a gap between the fourth lens 140 and the fifth lens 150 along the optical axis 190, the surface 11 represents a gap between the fifth lens 150 and the sixth lens 160 along the optical axis 190, the surface 13 represents a gap between the sixth lens 160 and the filter 170 along the optical axis 190, and the surface 15 represents a gap between the filter 170 and the image plane 181 along the optical axis 190.

In table 2, k represents the conic constant of the curve equation of aspheric surface profiles, and A2, A4, A6, A8, A10, A12, A14, A16, A18, and A20 represent the high-order aspheric coefficients.

The respective tables presented below for respective one of other embodiments are based on the schematic view, the field curvature curves and the distortion curves of this embodiment, and the definitions of parameters in the tables are the same as those in Tables 1-2 of the first embodiment. Therefore, an explanation in this regard will not be provided again.

Second Embodiment

Figure 2A:
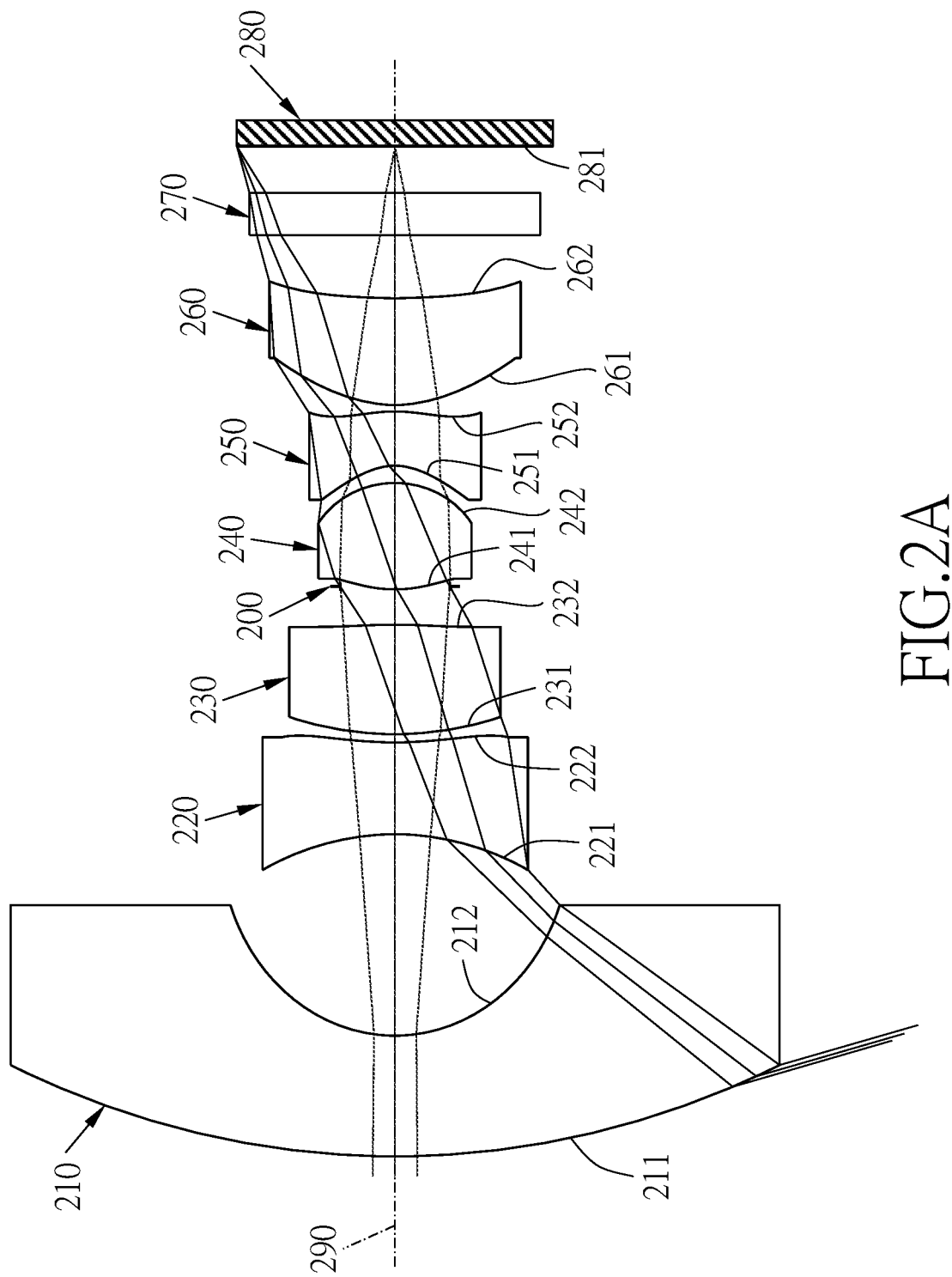
FIG. 2A shows a schematic view of an optical lens assembly in accordance with a second embodiment of the present invention.
Figure 2B:
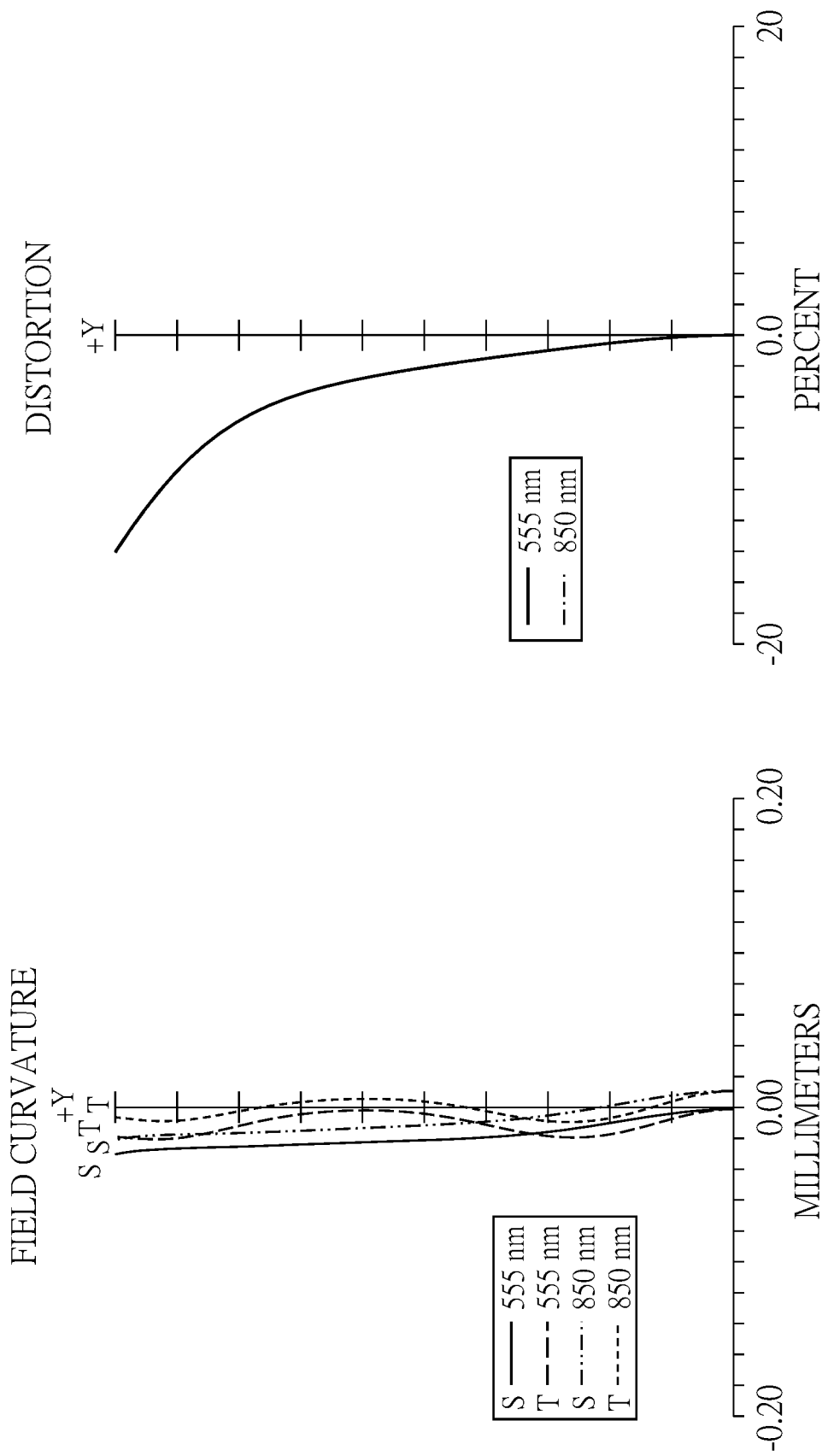
FIG. 2B shows, in order from left to right, the field curvature curve and the distortion curve of the second embodiment of the present invention, which illustrate the states of the field curvature curve and the distortion curve in both visible and infrared light bands.

Referring to FIGS. 2A and 2B, FIG. 2A shows a schematic view of an optical lens assembly in accordance with a second embodiment of the present invention, and FIG. 2B shows, in order from left to right, the field curvature curve and the distortion curve of the second embodiment of the present invention, illustrating the states of the field curvature curve and the distortion curve in both visible and infrared light bands. As shown in FIG. 2, the optical lens assembly includes, in order from an object side to an image side along an optical axis 290: a first lens 210, a second lens 220, a third lens 230, a fourth lens 240, a fifth lens 250, a sixth lens 260, a filter 270, and an image plane 281. The optical lens assembly cooperates with an image sensor 280 disposed on the image plane 281. The optical lens assembly has a total of six lenses with refractive power, but not limited thereto.

The first lens 210 with negative refractive power includes an object-side surface 211 and an image-side surface 212, the object-side surface 211 of the first lens 210 is convex in a paraxial region thereof, the image-side surface 212 of the first lens 210 is concave in a paraxial region thereof, and the first lens 210 is made of glass.

The second lens 220 with negative refractive power includes an object-side surface 221 and an image-side surface 222, the object-side surface 221 of the second lens 220 is concave in a paraxial region thereof, the image-side surface 222 of the second lens 220 is concave in a paraxial region thereof, the object-side surface 221 and the image-side surface 222 of the second lens 220 are aspheric, and the second lens 220 is made of plastic.

The third lens 230 with positive refractive power includes an object-side surface 231 and an image-side surface 232, the object-side surface 231 of the third lens 230 is convex in a paraxial region thereof, the image-side surface 232 of the third lens 230 is convex in a paraxial region thereof, the object-side surface 231 and the image-side surface 232 of the third lens 230 are aspheric, and the third lens 230 is made of plastic.

The fourth lens 240 with positive refractive power includes an object-side surface 241 and an image-side surface 242, the object-side surface 241 of the fourth lens 240 is convex in a paraxial region thereof, the image-side surface 242 of the fourth lens 240 is convex in a paraxial region thereof, the object-side surface 241 and the image-side surface 242 of the fourth lens 240 are aspheric, and the fourth lens 240 is made of plastic.

The fifth lens 250 with negative refractive power includes an object-side surface 251 and an image-side surface 252, the object-side surface 251 of the fifth lens 250 is concave in a paraxial region thereof, the image-side surface 252 of the fifth lens 250 is convex in a paraxial region thereof, the object-side surface 251 and the image-side surface 252 of the fifth lens 250 are aspheric, and the fifth lens 250 is made of plastic.

The sixth lens 260 with positive refractive power includes an object-side surface 261 and an image-side surface 262, the object-side surface 261 of the sixth lens 260 is convex in a paraxial region thereof, the image-side surface 262 of the sixth lens 260 is concave in a paraxial region thereof, the object-side surface 261 and the image-side surface 262 of the sixth lens 260 are aspheric, and the sixth lens 260 is made of plastic.

The filter 270 is made of glass, located between the sixth lens 260 and the image plane 281 and has no influence on the focal length of the optical lens assembly. In the present embodiment, a filter 270 is selected from filters that allow light in the visible light wavelengths (for example, but not limited to, the reference wavelength 555 nm), in the infrared light wavelengths (for example, but not limited to, the reference wavelength 850 nm) or in both the visible and infrared light wavelengths to pass therethrough.

The detailed optical data of the respective elements in the optical lens assembly of the second embodiment is shown in Table 3, and the aspheric surface data of the lenses in the second embodiment is shown in Table 4.

TABLE 3

Embodiment 2
f(focal length) = 0.56 mm, Fno = 2.25, FOV = 208.9 deg.

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 5.270 | 0.599 | glass | 1.804 | 46.5 | −1.57 |
| 2 | | 0.970 | 0.999 | | | | |
| 3 | Second lens | −1.545 (ASP) | 0.454 | plastic | 1.544 | 56.0 | −1.66 |
| 4 | | 2.423 (ASP) | 0.041 | | | | |
| 5 | Third lens | 1.998 (ASP) | 0.542 | plastic | 1.671 | 19.2 | 2.11 |
| 6 | | −4.479 (ASP) | 0.190 | | | | |
| 7 | Stop | infinity | −0.015 | | | | |
| 8 | Fourth lens | 0.819 (ASP) | 0.527 | plastic | 1.544 | 56.0 | 0.75 |
| 9 | | −0.627 (ASP) | 0.086 | | | | |
| 10 | Fifth lens | −0.366 (ASP) | 0.268 | plastic | 1.661 | 20.4 | −0.98 |
| 11 | | −1.075 (ASP) | 0.033 | | | | |
| 12 | Sixth lens | 0.777 (ASP) | 0.530 | plastic | 1.544 | 56.0 | 1.76 |
| 13 | | 3.102 (ASP) | 0.312 | | | | |
| 14 | Filter | infinity | 0.210 | glass | 1.517 | 64.2 | |
| 15 | | infinity | 0.230 | | | | |
| 16 | Image plane | infinity | — | | | | |

TABLE 4

Aspheric Coefficients

| Surface | 1 | 2 | 3 | 4 | 5 | 6 |
|---|---|---|---|---|---|---|
| K: | 0.0000E+00 | 0.0000E+00 | 1.2322E+00 | −1.2722E+01 | −1.3574E+01 | −2.7889E+01 |
| A2: | 0.0000E+00 | 0.0000E+00 | 0.0000E+00 | 0.0000E+00 | 0.0000E+00 | 0.0000E+00 |

TABLE 4-continued

Aspheric Coefficients

| A4: | 0.0000E+00 | 0.0000E+00 | 1.1481E-01 | -9.4634E-02 | 8.9272E-02 | 4.0746E-03 |
|---|---|---|---|---|---|---|
| A6: | 0.0000E+00 | 0.0000E+00 | 5.4202E-03 | -3.3652E-01 | 3.1318E-02 | 9.5158E-01 |
| A8: | 0.0000E+00 | 0.0000E+00 | -1.5024E-02 | -3.0905E-01 | 1.3303E-01 | 1.5611E+00 |
| A10: | 0.0000E+00 | 0.0000E+00 | -6.6354E-02 | -1.1537E-01 | 1.3303E-01 | 3.1432E+00 |
| A12: | 0.0000E+00 | 0.0000E+00 | -4.8056E-02 | 4.7984E-02 | 1.8828E+00 | 1.9400E+01 |
| A14: | 0.0000E+00 | 0.0000E+00 | 8.0132E-02 | -1.7356E-01 | 6.8885E-01 | 2.1183E+01 |
| A16: | 0.0000E+00 | 0.0000E+00 | 4.0038E-02 | 5.7837E-03 | -5.1247E+00 | 2.7452E+02 |
| A18: | 0.0000E+00 | 0.0000E+00 | -1.5732E-02 | 5.1439E-01 | -2.3010E+01 | -5.8540E+02 |
| A20: | 0.0000E+00 | 0.0000E+00 | -2.0330E-01 | 2.1682E+00 | -2.5387E+01 | -9.5116E+03 |

| Surface | 8 | 9 | 10 | 11 | 12 | 13 |
|---|---|---|---|---|---|---|
| K: | -2.1544E+01 | -5.8995E+00 | -4.5864E+00 | -1.1748E+01 | -4.2151E+00 | -9.9816E+01 |
| A2: | 0.0000E+00 | 0.0000E+00 | 0.0000E+00 | 0.0000E+00 | 0.0000E+00 | 0.0000E+00 |
| A4: | 3.5335E+00 | -3.9565E+00 | -4.6847E+00 | 9.2595E-01 | -2.9411E-01 | 2.3370E-02 |
| A6: | -4.1564E+01 | 1.7924E+01 | 5.6600E+01 | 6.2960E+00 | 3.4940E+00 | -2.3981E-01 |
| A8: | 3.0756E+02 | -9.0458E+01 | -3.5455E+02 | -2.5897E+01 | -1.1435E+01 | 3.1071E+00 |
| A10: | -1.5121E+03 | 1.6996E+02 | 8.6926E+02 | 2.2068E+01 | 1.8724E+01 | -2.0408E+00 |
| A12: | 2.6341E+03 | -1.2562E+02 | -1.3132E+02 | 3.0455E-01 | -6.2288E+00 | -8.3064E+00 |
| A14: | -1.3472E+04 | -8.9673E+02 | -5.2727E+01 | 1.9311E+02 | -3.3521E+01 | 6.4365E+00 |
| A16: | 2.8929E+04 | 4.0733E+03 | -2.3321E+02 | -3.0328E+02 | 4.3624E+01 | 2.3532E+00 |
| A18: | 9.4623E+04 | -2.2232E+03 | 1.3218E+03 | 6.9990E+02 | 5.6273E+00 | -2.5679E+00 |
| A20: | -4.7799E+05 | -2.5062E+04 | -2.1977E+04 | 1.4018E+03 | -1.9764E+01 | 9.9174E+00 |

In the second embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. These parameters can be calculated from Table 3 and Table 4 as the following values, and the following conditions in the following table are satisfied.

Embodiment 2

| f[mm] | 0.56 | f1*f2/f3[mm] | 1.24 |
|---|---|---|---|
| EPD | 0.25 | (CT1 + CT2)/CT3 | 1.94 |
| Fno | 2.25 | TL/(IMH*2) | 2.84 |
| FOV[deg.] | 208.9 | BFL/IMH | 0.85 |
| HFOV*EPD/TL[deg.] | 5.20 | vd4-vd5 | 35.63 |
| CT5*R10[mm$^2$] | -0.29 | f*(R1/R2) [mm] | 3.05 |
| f/f1 | -0.36 | f4*f6/(CT4 + CT6) [mm] | 1.24 |
| f/f5 | -0.57 | R7/R8 | -1.31 |
| f2/f3 | -0.79 | f3*CT3/(f4*CT4) | 0.34 |
| f3/f4 | 2.83 | f/(f4*f5*f6)[mm$^{-2}$] | -0.44 |
| f5/f6 | -0.56 | | |

Third Embodiment

Figure 3A:
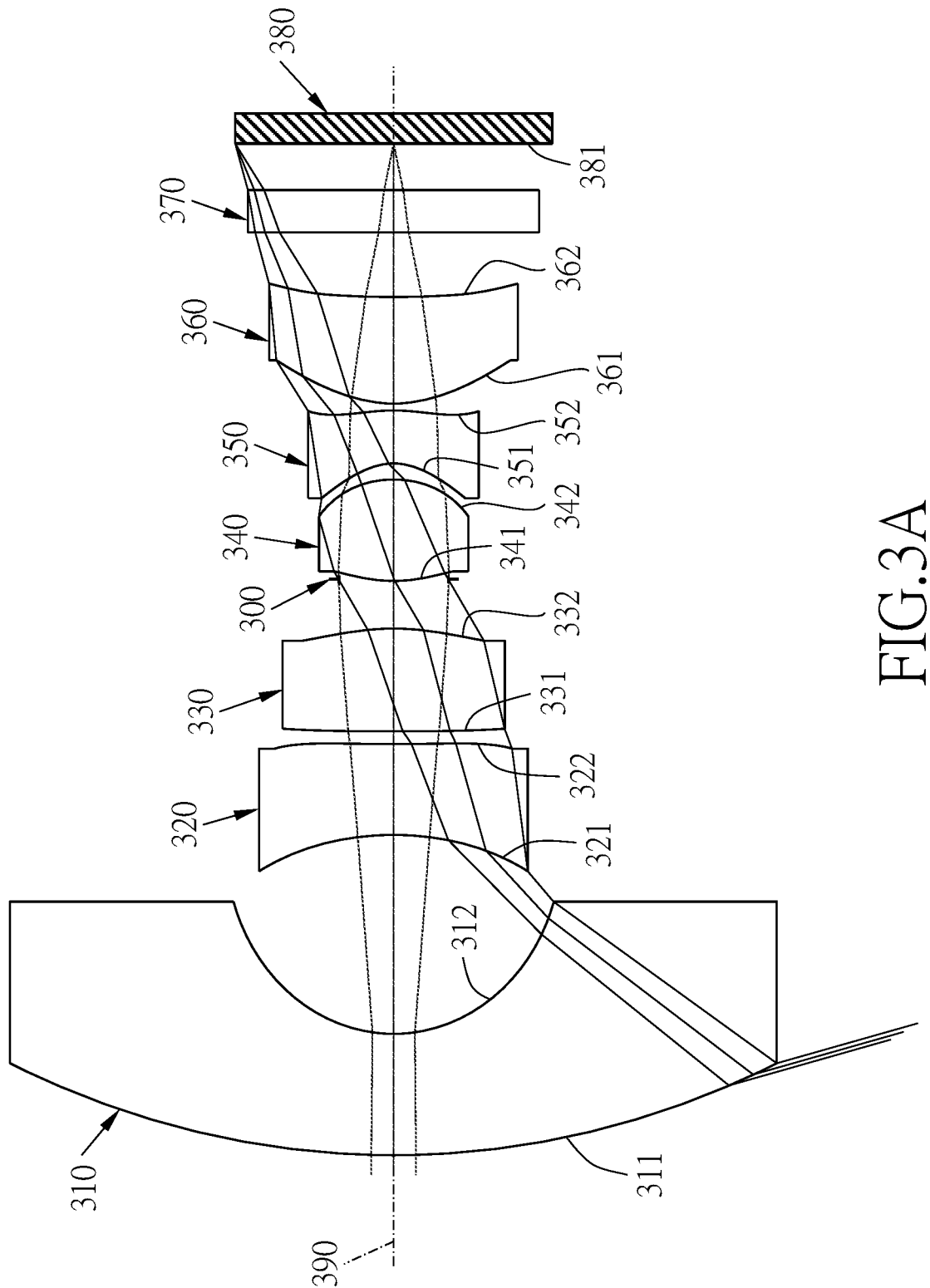
FIG. 3A shows a schematic view of an optical lens assembly in accordance with a third embodiment of the present invention.
Figure 3B:
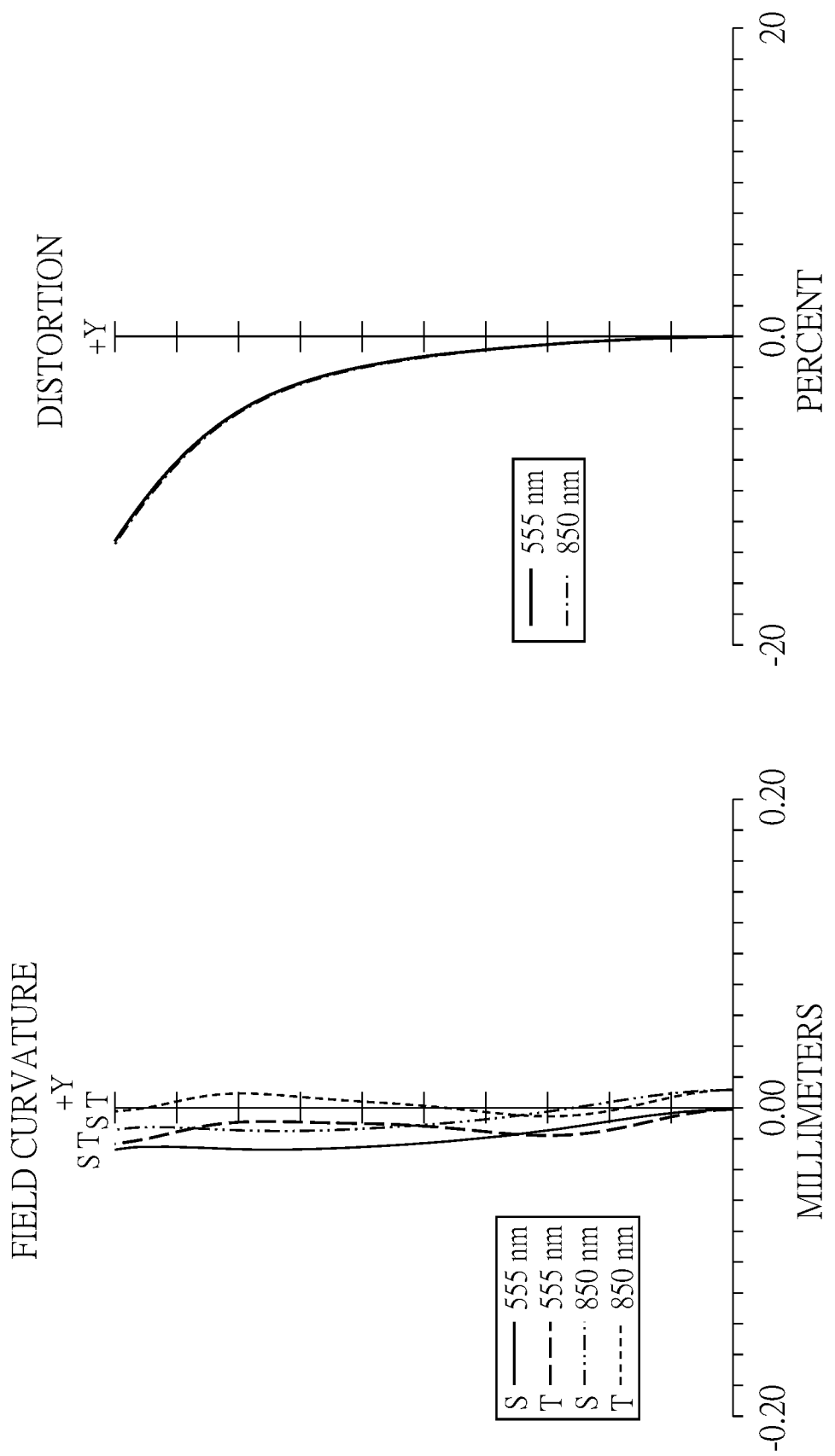
FIG. 3B shows, in order from left to right, the field curvature curve and the distortion curve of the third embodiment of the present invention, which illustrate the states of the field curvature curve and the distortion curve in both visible and infrared light bands.

Referring to FIGS. 3A and 3B, FIG. 3A shows a schematic view of an optical lens assembly in accordance with a third embodiment of the present invention, and FIG. 3B shows, in order from left to right, the field curvature curve and the distortion curve of the third embodiment of the present invention, illustrating the states of the field curvature curve and the distortion curve in both visible and infrared light bands. As shown in FIG. 3, the optical lens assembly includes, in order from an object side to an image side along an optical axis 390: a first lens 310, a second lens 320, a third lens 330, a fourth lens 340, a fifth lens 350, a sixth lens 360, a filter 370, and an image plane 381. The optical lens assembly cooperates with an image sensor 380 disposed on the image plane 381. The optical lens assembly has a total of six lenses with refractive power, but not limited thereto.

The first lens 310 with negative refractive power includes an object-side surface 311 and an image-side surface 312, the object-side surface 311 of the first lens 310 is convex in a paraxial region thereof, the image-side surface 312 of the first lens 310 is concave in a paraxial region thereof, and the first lens 310 is made of glass.

The second lens 320 with negative refractive power includes an object-side surface 321 and an image-side surface 322, the object-side surface 321 of the second lens 320 is concave in a paraxial region thereof, the image-side surface 322 of the second lens 320 is concave in a paraxial region thereof, the object-side surface 321 and the image-side surface 322 of the second lens 320 are aspheric, and the second lens 320 is made of plastic.

The third lens 330 with positive refractive power includes an object-side surface 331 and an image-side surface 332, the object-side surface 331 of the third lens 330 is convex in a paraxial region thereof, the image-side surface 332 of the third lens 330 is convex in a paraxial region thereof, the object-side surface 331 and the image-side surface 332 of the third lens 330 are aspheric, and the third lens 330 is made of plastic.

The fourth lens 340 with positive refractive power includes an object-side surface 341 and an image-side surface 342, the object-side surface 341 of the fourth lens 340 is convex in a paraxial region thereof, the image-side surface 342 of the fourth lens 340 is convex in a paraxial region thereof, the object-side surface 341 and the image-side surface 342 of the fourth lens 340 are aspheric, and the fourth lens 340 is made of plastic.

The fifth lens 350 with negative refractive power includes an object-side surface 351 and an image-side surface 352, the object-side surface 351 of the fifth lens 350 is concave in a paraxial region thereof, the image-side surface 352 of the fifth lens 350 is convex in a paraxial region thereof, the object-side surface 351 and the image-side surface 352 of the fifth lens 350 are aspheric, and the fifth lens 350 is made of plastic.

The sixth lens 360 with positive refractive power includes an object-side surface 361 and an image-side surface 362, the object-side surface 361 of the sixth lens 360 is convex in a paraxial region thereof, the image-side surface 362 of the sixth lens 360 is concave in a paraxial region thereof, the object-side surface 361 and the image-side surface 362 of the sixth lens 360 are aspheric, and the sixth lens 360 is made of plastic.

The filter 370 is made of glass, is located between the sixth lens 360 and the image plane 381 and has no influence on the focal length of the optical lens assembly. In the present embodiment, the filter 370 is selected from filters that allow light in the visible light wavelengths (for example, but not limited to, the reference wavelength 555 nm), in the infrared light wavelengths (for example, but not limited to, the reference wavelength 850 nm) or in both the visible and infrared light wavelengths to pass therethrough.

The detailed optical data of the respective elements in the optical lens assembly of the third embodiment is shown in Table 5, and the aspheric surface data of the lenses in the third embodiment is shown in Table 6.

TABLE 5

Embodiment 3
f(focal length) = 0.56 mm, Fno = 2.25, FOV = 208.4 deg.

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 5.205 | 0.599 | glass | 1.804 | 46.5 | −1.50 |
| 2 | | 0.929 | 0.987 | | | | |
| 3 | Second lens | −1.830 (ASP) | 0.450 | plastic | 1.544 | 56.0 | −2.86 |
| 4 | | 11.644 (ASP) | 0.063 | | | | |
| 5 | Third lens | 48.596 (ASP) | 0.508 | plastic | 1.671 | 19.2 | 2.28 |
| 6 | | −1.587 (ASP) | 0.244 | | | | |
| 7 | Stop | infinity | −0.008 | | | | |
| 8 | Fourth lens | 0.974 (ASP) | 0.501 | plastic | 1.544 | 56.0 | 0.83 |
| 9 | | −0.686 (ASP) | 0.080 | | | | |
| 10 | Fifth lens | −0.374 (ASP) | 0.263 | plastic | 1.661 | 20.4 | −0.93 |
| 11 | | −1.217 (ASP) | 0.033 | | | | |
| 12 | Sixth lens | 0.781 (ASP) | 0.529 | plastic | 1.544 | 56.0 | 1.58 |
| 13 | | 6.416 (ASP) | 0.319 | | | | |
| 14 | Filter | infinity | 0.210 | glass | 1.517 | 64.2 | |
| 15 | | infinity | 0.230 | | | | |
| 16 | Image plane | infinity | | | | | |

TABLE 6

Aspheric Coefficients

| Surface | 1 | 2 | 3 | 4 | 5 | 6 |
|---|---|---|---|---|---|---|
| K: | 0.0000E+00 | 0.0000E+00 | 1.9454E+00 | −9.9802E+01 | −4.9085E+01 | −1.4001E+01 |
| A2: | 0.0000E+00 | 0.0000E+00 | 0.0000E+00 | 0.0000E+00 | 0.0000E+00 | 0.0000E+00 |
| A4: | 0.0000E+00 | 0.0000E+00 | −2.9584E−02 | −1.0701E−01 | 7.9460E−02 | −1.0936E−01 |
| A6: | 0.0000E+00 | 0.0000E+00 | 4.0036E−02 | −1.7851E−01 | −6.1443E−02 | 5.0940E−01 |
| A8: | 0.0000E+00 | 0.0000E+00 | 1.1027E−02 | −2.2414E−01 | −1.1873E−02 | 5.8307E−02 |
| A10: | 0.0000E+00 | 0.0000E+00 | −2.6033E−02 | 5.6455E−02 | −1.1873E−02 | 7.4341E−01 |
| A12: | 0.0000E+00 | 0.0000E+00 | −1.3390E−02 | 1.6112E−02 | 1.8213E−01 | 1.9850E+00 |
| A14: | 0.0000E+00 | 0.0000E+00 | 8.7168E−05 | −6.6946E−02 | 2.4060E−01 | −6.9086E+00 |
| A16: | 0.0000E+00 | 0.0000E+00 | −3.0969E−02 | 1.6634E−01 | −2.0460E+00 | −8.8302E+00 |
| A18: | 0.0000E+00 | 0.0000E+00 | −2.5949E−03 | 4.5795E−01 | −1.2971E+00 | −3.1474E+00 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −3.2569E+01 | −5.5802E+00 | −4.2783E+00 | −1.1665E+01 | −3.2162E+00 | −9.9807E+01 |
| A2: | 0.0000E+00 | 0.0000E+00 | 0.0000E+00 | 0.0000E+00 | 0.0000E+00 | 0.0000E+00 |
| A4: | 3.6013E+00 | −4.0295E+00 | −5.1224E+00 | 9.2465E−01 | −3.9228E−01 | 1.4038E−01 |
| A6: | −4.1121E+01 | 1.7463E+01 | 5.7462E+01 | 5.9229E+00 | 3.3962E+00 | −4.3512E−01 |
| A8: | 3.0725E+02 | −8.9997E+01 | −3.5089E+02 | −2.6681E+01 | −1.1342E+01 | 2.9703E+00 |
| A10: | −1.5098E+03 | 1.7991E+02 | 8.6383E+02 | 2.5982E+01 | 1.9000E+01 | −2.3991E+00 |
| A12: | 2.6493E+03 | −1.2667E+02 | −1.7042E+02 | 1.9945E+01 | −5.8409E+00 | −8.3769E+00 |
| A14: | −1.3975E+04 | −1.1681E+03 | −5.7153E+01 | 2.2944E+02 | −3.3914E+01 | 7.7273E+00 |
| A16: | 2.0953E+04 | 2.8033E+03 | 2.5812E+02 | −3.5149E+02 | 4.0052E+01 | 5.1616E+00 |
| A18: | 3.5251E+04 | 6.4678E+02 | 1.0726E+03 | 4.4141E+00 | −2.6468E−01 | −1.2290E+00 |
| A20: | 0.0000E+00 | 0.0000E+00 | 0.0000E+00 | 0.0000E+00 | −1.9879E−01 | −5.8320E−03 |

In the third embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. Moreover, these parameters can be calculated from Table 5 and Table 6 as the following values, and the following conditions in the following table are satisfied.

Embodiment 3

| | | | |
|---|---|---|---|
| f[mm] | 0.56 | f1*f2/f3[mm] | 1.88 |
| EPD | 0.25 | (CT1 + CT2)/CT3 | 2.06 |
| Fno | 2.25 | TL/(IMH*2) | 2.84 |
| FOV[deg.] | 208.4 | BFL/IMH | 0.86 |
| HFOV*EPD/TL[deg.] | 5.15 | vd4-vd5 | 35.63 |
| CT5*R10[mm$^2$] | −0.32 | f*(R1/R2) [mm] | 3.12 |
| f/f1 | −0.37 | f4*f6/(CT4 + CT6) [mm] | 1.26 |
| f/f5 | −0.60 | R7/R8 | −1.42 |
| f2/f3 | −1.26 | f3*CT3/(f4*CT4) | 0.36 |
| f3/f4 | 2.76 | f/(f4*f5*f6)[mm$^{-2}$] | −0.46 |
| f5/f6 | −0.59 | | |

Fourth Embodiment

Figure 4A:
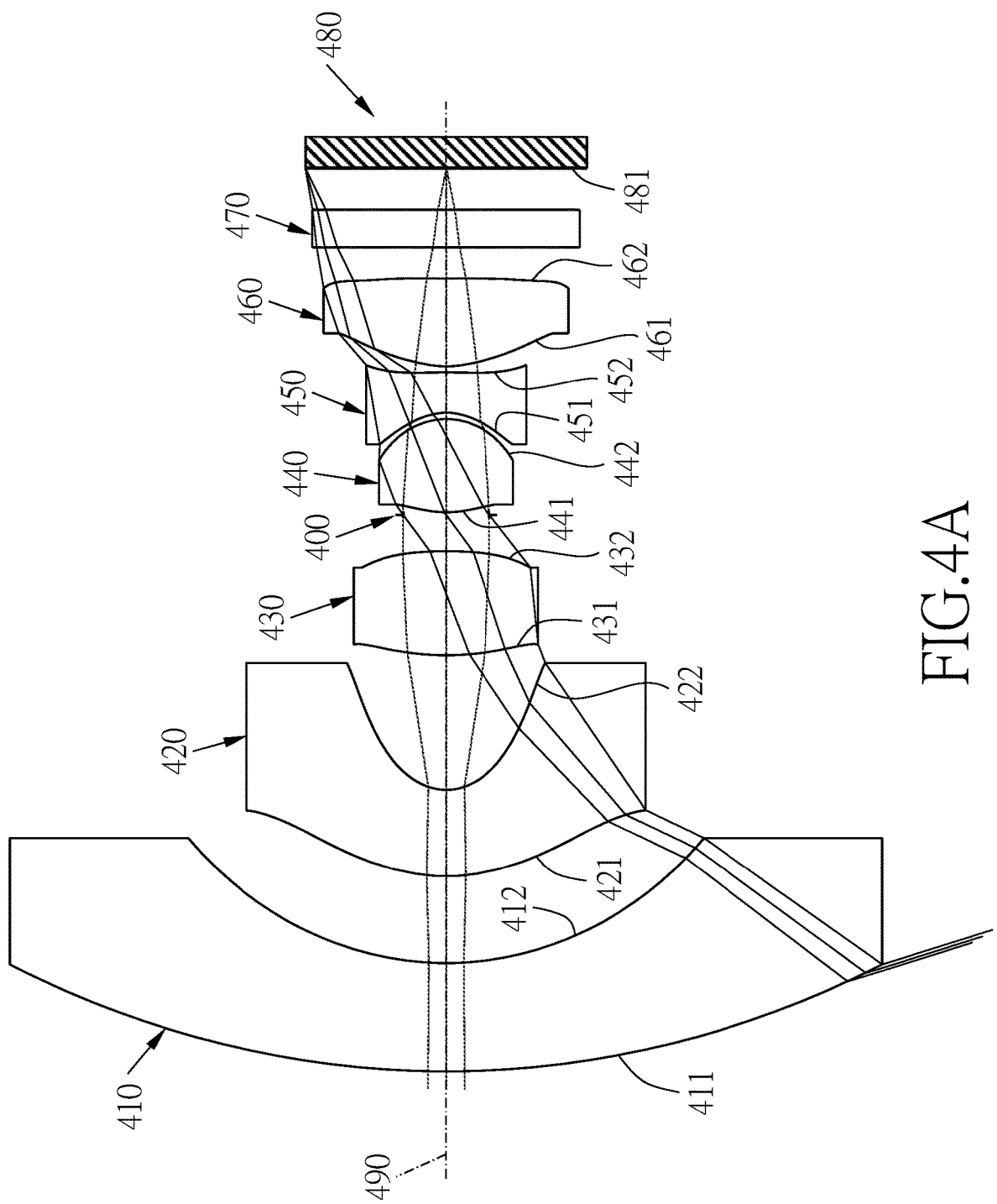
FIG. 4A shows a schematic view of an optical lens assembly in accordance with a fourth embodiment of the present invention.
Figure 4B:
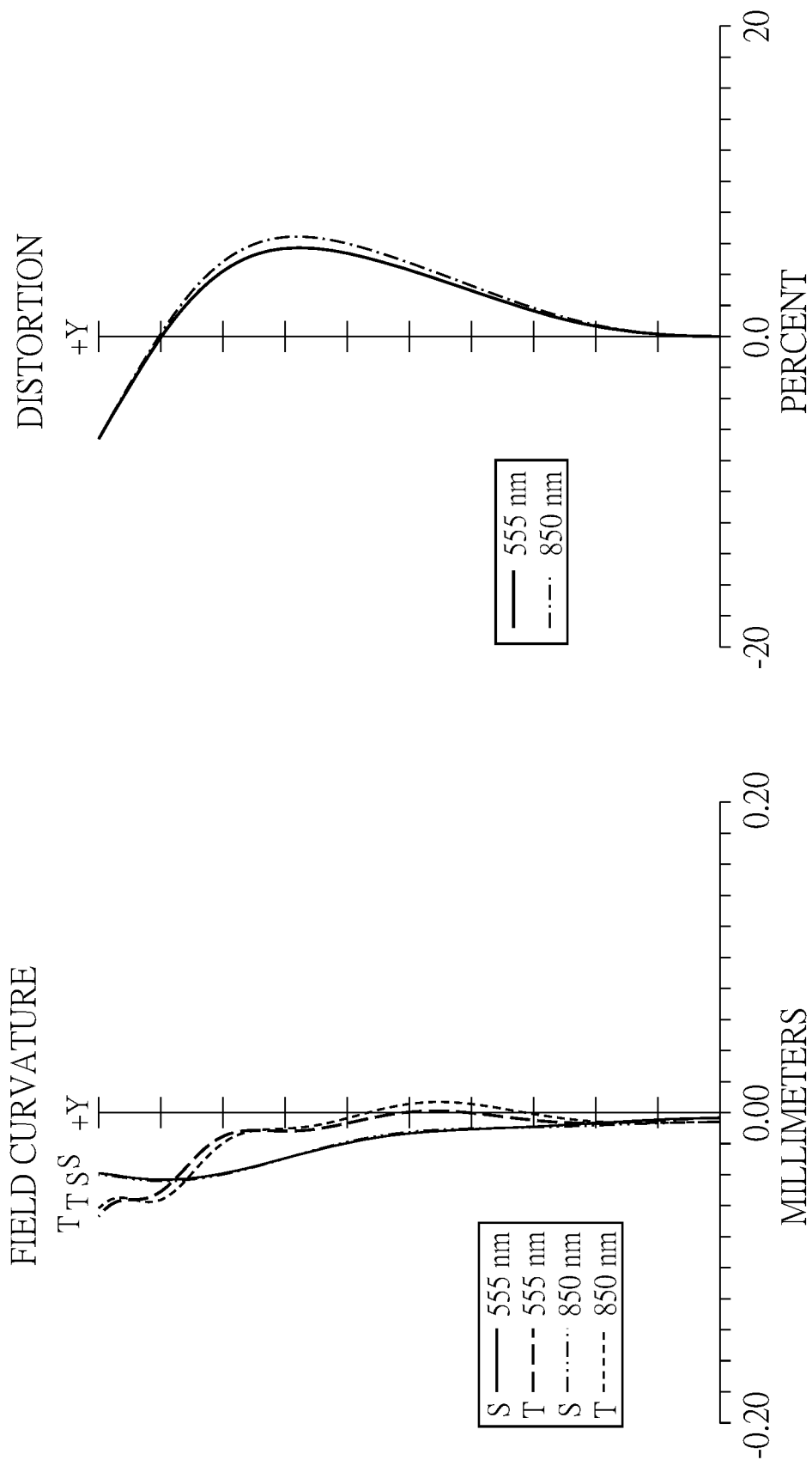
FIG. 4B shows, in order from left to right, the field curvature curve and the distortion curve of the fourth embodiment of the present invention, which illustrate the states of the field curvature curve and the distortion curve in both visible and infrared light bands.

Referring to FIGS. 4A and 4B, FIG. 4A shows a schematic view of an optical lens assembly in accordance with a fourth embodiment of the present invention, and FIG. 4B shows, in order from left to right, the field curvature curve and the distortion curve of the fourth embodiment of the present invention, illustrating the states of the field curvature curve and the distortion curve in both visible and infrared light bands. As shown in FIG. 4A, the optical lens assembly includes, in order from an object side to an image side along an optical axis 490: a first lens 410, a second lens 420, a third lens 430, a fourth lens 440, a fifth lens 450, a sixth lens 460, a filter 470, and an image plane 481. The optical lens assembly cooperates with an image sensor 480 disposed on the image plane 481. The optical lens assembly has a total of six lenses with refractive power, but not limited thereto.

The first lens 410 with negative refractive power includes an object-side surface 411 and an image-side surface 412, the object-side surface 411 of the first lens 410 is convex in a paraxial region thereof, the image-side surface 412 of the first lens 410 is concave in a paraxial region thereof, and the first lens 410 is made of glass.

The second lens 420 with negative refractive power includes an object-side surface 421 and an image-side surface 422, the object-side surface 421 of the second lens 420 is convex in a paraxial region thereof, the image-side surface 422 of the second lens 420 is concave in a paraxial region thereof, the object-side surface 421 and the image-side surface 422 of the second lens 420 are aspheric, and the second lens 420 is made of plastic.

The third lens 430 with positive refractive power includes an object-side surface 431 and an image-side surface 432, the object-side surface 431 of the third lens 430 is convex in a paraxial region thereof, the image-side surface 432 of the third lens 430 is convex in a paraxial region thereof, the object-side surface 431 and the image-side surface 432 of the third lens 430 are aspheric, and the third lens 430 is made of plastic.

The fourth lens 440 with positive refractive power includes an object-side surface 441 and an image-side surface 442, the object-side surface 441 of the fourth lens 440 is convex in a paraxial region thereof, the image-side surface 442 of the fourth lens 440 is convex in a paraxial region thereof, the object-side surface 441 and the image-side surface 442 of the fourth lens 440 are aspheric, and the fourth lens 440 is made of plastic.

The fifth lens 450 with negative refractive power includes an object-side surface 451 and an image-side surface 452, the object-side surface 451 of the fifth lens 450 is concave in a paraxial region thereof, the image-side surface 452 of the fifth lens 450 is convex in a paraxial region thereof, the object-side surface 451 and the image-side surface 452 of the fifth lens 450 are aspheric, and the fifth lens 450 is made of plastic.

The sixth lens 460 with positive refractive power includes an object-side surface 461 and an image-side surface 462, the object-side surface 461 of the sixth lens 460 is convex in a paraxial region thereof, the image-side surface 462 of the sixth lens 460 is concave in a paraxial region thereof, the object-side surface 461 and the image-side surface 462 of the sixth lens 460 are aspheric, and the sixth lens 460 is made of plastic.

The filter 470 is made of glass, is located between the sixth lens 460 and the image plane 481, and has no influence on the focal length of the optical lens assembly. In the present embodiment, the filter 470 is selected from filters that allow light in the visible light wavelengths (for example, but not limited to, the reference wavelength 555 nm), in the infrared light wavelengths (for example, but not limited to, the reference wavelength 850 nm) or in both the visible and infrared light wavelengths to pass therethrough.

The detailed optical data of the respective elements in the optical lens assembly of the fourth embodiment is shown in Table 7, and the aspheric surface data of the lenses in the fourth embodiment is shown in Table 8.

TABLE 7

Embodiment 4
f(focal length) = 0.51 mm, Fno = 2.25, FOV = 211.1 deg.

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 6.524 | 0.599 | glass | 1.804 | 46.5 | −4.39 |
| 2 | | 2.202 | 0.484 | | | | |
| 3 | Second lens | 1.392 (ASP) | 0.479 | plastic | 1.544 | 56.0 | −0.98 |
| 4 | | 0.376 (ASP) | 0.744 | | | | |
| 5 | Third lens | 1.867 (ASP) | 0.580 | plastic | 1.671 | 19.2 | 1.82 |
| 6 | | −3.143 (ASP) | 0.201 | | | | |
| 7 | Stop | infinity | 0.015 | | | | |
| 8 | Fourth lens | 0.829 (ASP) | 0.518 | plastic | 1.544 | 56.0 | 0.63 |
| 9 | | −0.453 (ASP) | 0.033 | | | | |
| 10 | Fifth lens | −0.389 (ASP) | 0.227 | plastic | 1.661 | 20.4 | −0.62 |

TABLE 7-continued

Embodiment 4
f(focal length) = 0.51 mm, Fno = 2.25, FOV = 211.1 deg.

| Surface | | Curvature Radius | Thickness/gap | Material | Refractive Index (nd) | Abbe number (vd) | Focal length |
|---|---|---|---|---|---|---|---|
| 11 | | −6.915 (ASP) | 0.033 | | | | |
| 12 | Sixth lens | 0.714 (ASP) | 0.486 | plastic | 1.544 | 56.0 | 1.34 |
| 13 | | 24.209 (ASP) | 0.170 | | | | |
| 14 | Filter | infinity | 0.210 | glass | 1.517 | 64.2 | |
| 15 | | infinity | 0.230 | | | | |
| 16 | Image plane | infinity | | | | | |

TABLE 8

Aspheric Coefficients

| Surface | 1 | 2 | 3 | 4 | 5 | 6 |
|---|---|---|---|---|---|---|
| K:   | 0.0000E+00 | 0.0000E+00 | −8.9001E−01 | −6.8936E−01 | −7.5017E−01 | 2.7912E+01 |
| A2:  | 0.0000E+00 | 0.0000E+00 | 0.0000E+00 | 0.0000E+00 | 0.0000E+00 | 0.0000E+00 |
| A4:  | 0.0000E+00 | 0.0000E+00 | −1.7382E−02 | 5.3300E−01 | −7.0383E−02 | −6.1685E−01 |
| A6:  | 0.0000E+00 | 0.0000E+00 | −4.5036E−02 | 9.0164E−03 | 2.5682E−01 | 1.0654E+00 |
| A8:  | 0.0000E+00 | 0.0000E+00 | −4.3982E−03 | 1.8431E+00 | −1.4167E+00 | −5.3790E−01 |
| A10: | 0.0000E+00 | 0.0000E+00 | 1.5613E−03 | 5.8289E+00 | −1.4167E+00 | −3.1584E+00 |
| A12: | 0.0000E+00 | 0.0000E+00 | 1.5276E−03 | −1.1179E+01 | 1.2894E+01 | −9.3899E+00 |
| A14: | 0.0000E+00 | 0.0000E+00 | 6.2660E−05 | −9.2471E+01 | 7.3532E+00 | 2.7531E+01 |
| A16: | 0.0000E+00 | 0.0000E+00 | −5.3617E−05 | −7.8220E+01 | −1.7164E+02 | 1.1691E+02 |
| A18: | 0.0000E+00 | 0.0000E+00 | −7.9682E−05 | −6.0828E+01 | −2.9063E+01 | −1.4045E+01 |
| A20: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K:   | −2.6463E+01 | −5.5904E+00 | −6.4671E+00 | 9.9801E+01 | −1.1683E+01 | −9.1716E+01 |
| A2:  | 0.0000E+00 | 0.0000E+00 | 0.0000E+00 | 0.0000E+00 | 0.0000E+00 | 0.0000E+00 |
| A4:  | 3.6576E+00 | −4.7023E+00 | −5.1908E+00 | 6.8682E−01 | 9.4778E−02 | −5.3087E−01 |
| A6:  | −5.0195E+01 | 1.7720E+01 | 4.9649E+01 | 5.5502E+00 | 2.6216E+00 | 8.4889E−01 |
| A8:  | 3.1427E+02 | −9.5432E+01 | −3.4977E+02 | −2.8290E+01 | −1.2139E+01 | 1.6175E+00 |
| A10: | −1.1018E+03 | 1.6649E+02 | 1.0074E+03 | 2.4181E+01 | 2.1034E+01 | −1.3199E+00 |
| A12: | 1.6496E+03 | 2.2313E+02 | 4.5889E+02 | 4.9680E+01 | −2.0066E+00 | −7.0587E+00 |
| A14: | −6.0650E+04 | 5.8880E+02 | 6.3854E+02 | 2.9994E+02 | −3.3747E+01 | 5.4887E−01 |
| A16: | −1.7819E+04 | −1.3515E+04 | −1.3538E+04 | −5.9805E+02 | 9.7552E+00 | 1.2239E+01 |
| A18: | 1.9424E+06 | 5.8905E+03 | −1.3886E+04 | −3.8157E+02 | 1.0386E+00 | −4.6285E+00 |
| A20: | −3.0510E+05 | 7.4203E+04 | −2.8696E+04 | −6.4025E+02 | 1.3774E+01 | −3.5154E+00 |

In the fourth embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. Moreover, the values of these parameters can be calculated from Table 7 and Table 8, and the following conditions in the following table are satisfied.

| Embodiment 4 | | | |
|---|---|---|---|
| f[mm] | 0.51 | f1*f2/f3[mm] | 2.36 |
| EPD | 0.23 | (CT1 + CT2)/CT3 | 1.86 |
| Fno | 2.25 | TL/(IMH*2) | 2.85 |
| FOV[deg.] | 211.1 | BFL/IMH | 0.69 |
| HFOV*EPD/TL[deg.] | 4.77 | vd4-vd5 | 36.76 |
| CT5*R10[mm$^2$] | −1.57 | f*(R1/R2) | 1.51 |
| f/f1 | −0.12 | f4*f6/(CT4 + CT6) [mm] | 0.83 |
| f/f5 | −0.83 | R7/R8 | −1.83 |
| f2/f3 | −0.54 | f3*CT3/(f4*CT4) | 0.31 |
| f3/f4 | 2.90 | f/(f4*f5*f6)[mm$^{-2}$] | −0.99 |
| f5/f6 | −0.46 | | |

Fifth Embodiment

Figure 5A:
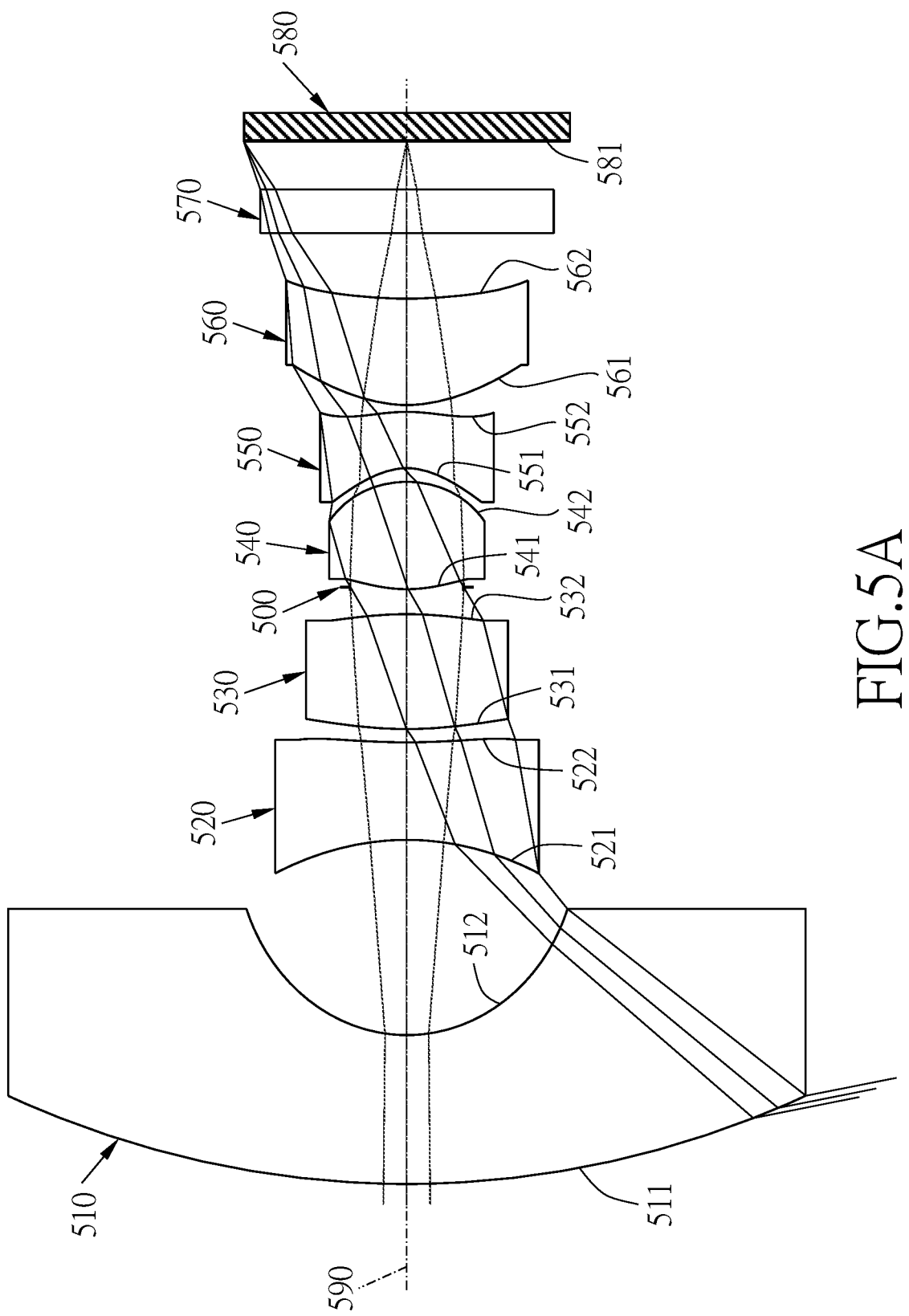
FIG. 5A shows a schematic view of an optical lens assembly in accordance with a fifth embodiment of the present invention.
Figure 5B:
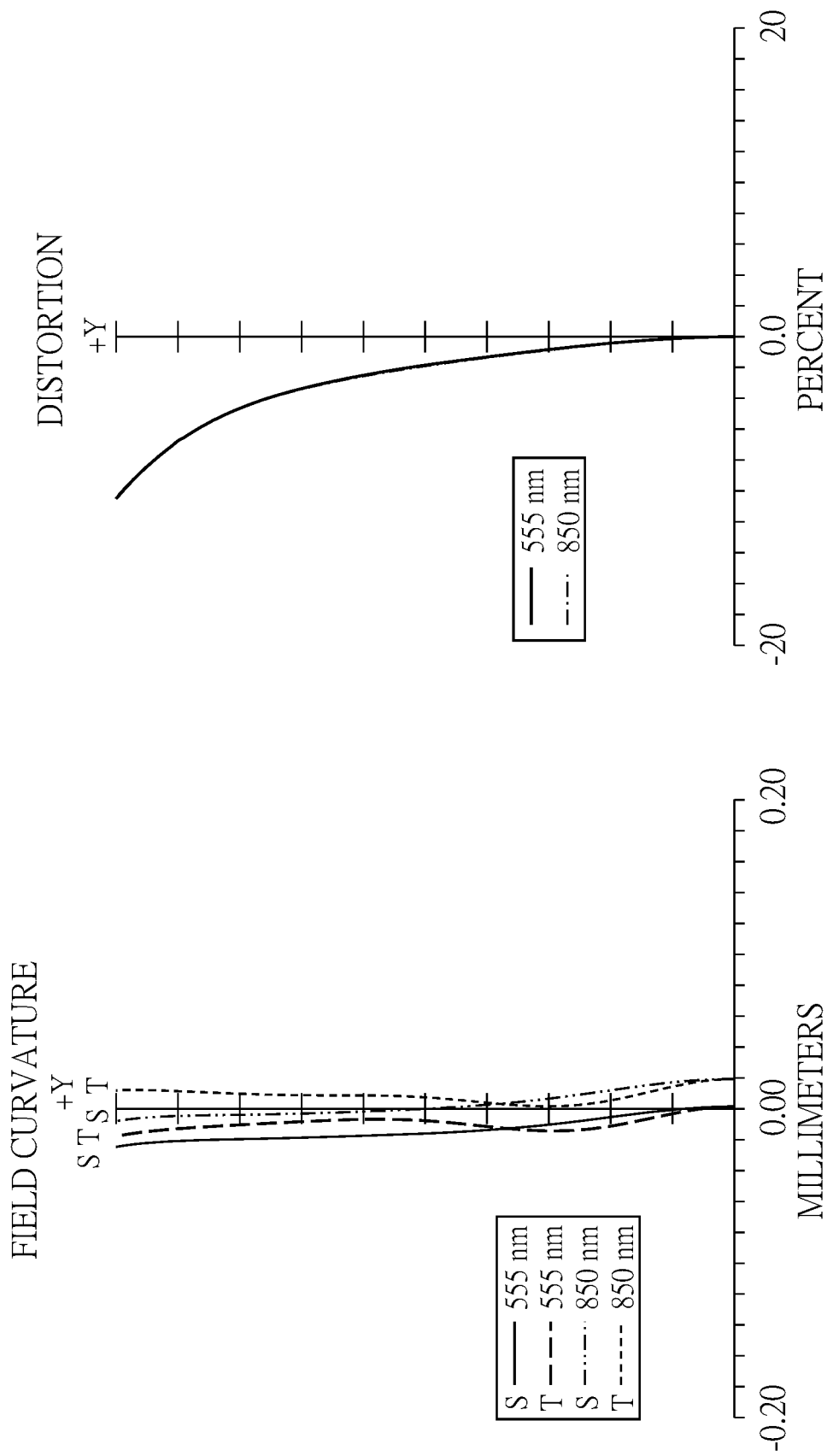
FIG. 5B shows, in order from left to right, the field curvature curve and the distortion curve of the fifth embodiment of the present invention, which illustrate the states of the field curvature curve and the distortion curve in both visible and infrared light bands.

Referring to FIGS. 5A and 5B, FIG. 5A shows a schematic view of an optical lens assembly in accordance with a fifth embodiment of the present invention, and FIG. 5B shows, in order from left to right, the field curvature curve and the distortion curve of the fifth embodiment of the present invention, illustrating the states of the field curvature curve and the distortion curve in both visible and infrared light bands. As shown in FIG. 5A, the optical lens assembly includes, in order from an object side to an image side along an optical axis 590: a first lens 510, a second lens 520, a third lens 530, a fourth lens 540, a fifth lens 550, a sixth lens 560, a filter 570, and an image plane 581. The optical lens assembly cooperates with an image sensor 580 disposed on the image plane 581. The optical lens assembly has a total of six lenses with refractive power, but not limited thereto.

The first lens 510 with negative refractive power includes an object-side surface 511 and an image-side surface 512, the object-side surface 511 of the first lens 510 is convex in a paraxial region thereof, the image-side surface 512 of the first lens 510 is concave in a paraxial region thereof, and the first lens 510 is made of glass.

The second lens 520 with negative refractive power includes an object-side surface 521 and an image-side surface 522, the object-side surface 521 of the second lens 520 is concave in a paraxial region thereof, the image-side surface 522 of the second lens 520 is concave in a paraxial region thereof, the object-side surface 521 and the image-side surface 522 of the second lens 520 are aspheric, and the second lens 520 is made of plastic.

The third lens 530 with positive refractive power includes an object-side surface 531 and an image-side surface 532, the object-side surface 531 of the third lens 530 is convex in a paraxial region thereof, the image-side surface 532 of the third lens 530 is convex in a paraxial region thereof, the object-side surface 531 and the image-side surface 532 of the third lens 530 are aspheric, and the third lens 530 is made of plastic.

The fourth lens 540 with positive refractive power includes an object-side surface 541 and an image-side surface 542, the object-side surface 541 of the fourth lens 540 is convex in a paraxial region thereof, the image-side surface 542 of the fourth lens 540 is convex in a paraxial region thereof, the object-side surface 541 and the image-side surface 542 of the fourth lens 540 are aspheric, and the fourth lens 540 is made of plastic.

The fifth lens 550 with negative refractive power includes an object-side surface 551 and an image-side surface 552, the object-side surface 551 of the fifth lens 550 is concave in a paraxial region thereof, the image-side surface 552 of the fifth lens 550 is convex in a paraxial region thereof, the object-side surface 551 and the image-side surface 552 of the fifth lens 550 are aspheric, and the fifth lens 550 is made of plastic.

The sixth lens 560 with positive refractive power includes an object-side surface 561 and an image-side surface 562, the object-side surface 561 of the sixth lens 560 is convex in a paraxial region thereof, the image-side surface 562 of the sixth lens 560 is concave in a paraxial region thereof, the object-side surface 561 and the image-side surface 562 of the sixth lens 560 are aspheric, and the sixth lens 560 is made of plastic.

The filter 570 is made of glass, is located between the sixth lens 560 and the image plane 581, and has no influence on the focal length of the optical lens assembly. In the present embodiment, the filter 570 is selected from filters that allow light in the visible light wavelengths (for example, but not limited to, the reference wavelength 555 nm), in the infrared light wavelengths (for example, but not limited to, the reference wavelength 850 nm) or in both the visible and infrared light wavelengths to pass therethrough.

The detailed optical data of the respective elements in the optical lens assembly of the fifth embodiment is shown in Table 9, and the aspheric surface data of the lenses in the fifth embodiment is shown in Table 10.

TABLE 9

Embodiment 5
f(focal length) = 0.56 mm, Fno = 2.25, FOV = 200.0 deg.

| Surface | | Curvature Radius | Thickness/gap | Material | Refractive Index (nd) | Abbe number (vd) | Focal length |
|---|---|---|---|---|---|---|---|
| 0 | Object | infinity | infinity | | | | |
| 1 | First lens | 5.657 | 0.716 | glass | 1.804 | 46.5 | −1.46 |
| 2 | | 0.920 | 0.937 | | | | |
| 3 | Second lens | −1.594 (ASP) | 0.468 | plastic | 1.544 | 56.0 | −2.02 |
| 4 | | 3.977 (ASP) | 0.066 | | | | |
| 5 | Third lens | 2.769 (ASP) | 0.551 | plastic | 1.671 | 19.2 | 1.92 |
| 6 | | −2.249 (ASP) | 0.130 | | | | |
| 7 | Stop | infinity | −0.009 | | | | |
| 8 | Fourth lens | 0.931 (ASP) | 0.513 | plastic | 1.544 | 56.0 | 0.81 |
| 9 | | −0.679 (ASP) | 0.068 | | | | |
| 10 | Fifth lens | −0.389 (ASP) | 0.270 | plastic | 1.661 | 20.4 | −1.05 |
| 11 | | −1.125 (ASP) | 0.033 | | | | |
| 12 | Sixth lens | 0.795 (ASP) | 0.511 | plastic | 1.544 | 56.0 | 1.94 |
| 13 | | 2.484 (ASP) | 0.314 | | | | |
| 14 | Filter | infinity | 0.210 | glass | 1.517 | 64.2 | |
| 15 | | infinity | 0.230 | | | | |
| 16 | Image plane | infinity | | | | | |

TABLE 10

Aspheric Coefficients

| Surface | 1 | 2 | 3 | 4 | 5 | 6 |
|---|---|---|---|---|---|---|
| K: | 0.0000E+00 | 0.0000E+00 | 1.4692E+00 | −2.7113E+01 | −1.6874E+01 | −2.1195E+01 |
| A2: | 0.0000E+00 | 0.0000E+00 | 0.0000E+00 | 0.0000E+00 | 0.0000E+00 | 0.0000E+00 |
| A4: | 0.0000E+00 | 0.0000E+00 | 6.7029E−02 | −8.1202E−02 | 5.3593E−02 | −2.7681E−02 |
| A6: | 0.0000E+00 | 0.0000E+00 | 7.1236E−02 | −2.7216E−01 | −9.1510E−02 | 4.4607E−01 |
| A8: | 0.0000E+00 | 0.0000E+00 | −1.0655E−02 | −3.5089E−01 | −3.6515E−01 | 1.0583E−01 |
| A10: | 0.0000E+00 | 0.0000E+00 | −5.8465E−02 | 1.7320E−02 | −3.6515E−01 | 1.6096E+00 |
| A12: | 0.0000E+00 | 0.0000E+00 | −3.1272E−02 | −1.2189E−01 | 4.6615E−01 | 6.0745E−02 |
| A14: | 0.0000E+00 | 0.0000E+00 | 9.1669E−02 | −2.0102E−01 | 9.5326E−01 | −4.2373E+01 |
| A16: | 0.0000E+00 | 0.0000E+00 | 9.0052E−02 | 4.3096E−01 | −3.0803E+00 | −2.1692E+02 |
| A18: | 0.0000E+00 | 0.0000E+00 | 1.1537E−01 | 8.4296E−01 | −1.1287E+01 | −2.1522E+02 |
| A20: | 0.0000E+00 | 0.0000E+00 | −5.1548E−01 | −7.3949E−01 | −3.7813E+01 | 1.2673E+03 |

TABLE 10-continued

| Aspheric Coefficients | | | | | | |
|---|---|---|---|---|---|---|
| Surface | 8 | 9 | 10 | 11 | 12 | 13 |
| K: | −2.8352E+01 | −5.1181E+00 | −4.6969E+00 | −1.1407E+01 | −3.8963E+00 | −6.3406E+01 |
| A2: | 0.0000E+00 | 0.0000E+00 | 0.0000E+00 | 0.0000E+00 | 0.0000E+00 | 0.0000E+00 |
| A4: | 3.5233E+00 | −4.0449E+00 | −4.8731E+00 | 9.9816E−01 | −3.5480E−01 | 8.0042E−02 |
| A6: | −4.1483E+01 | 1.7855E+01 | 5.6880E+01 | 6.3540E+01 | 3.4594E+00 | −2.8642E−01 |
| A8: | 3.0729E+02 | −8.9921E+01 | −3.5233E+02 | −2.6788E+01 | −1.1409E+01 | 2.8925E+00 |
| A10: | −1.4982E+03 | 1.7352E+02 | 8.7027E+02 | 2.1863E+01 | 1.8736E+01 | −2.0858E+00 |
| A12: | 2.7121E+03 | −1.2506E+02 | −1.4507E+02 | 6.3462E+00 | −6.0150E+00 | −8.0803E+00 |
| A14: | −1.3843E+04 | −1.0235E+03 | −1.3792E+02 | 2.1459E+02 | −3.2749E+01 | 8.1009E+00 |
| A16: | 1.8834E+04 | 3.7935E+03 | −6.9503E+02 | −2.7083E+02 | 4.4447E+01 | 4.7169E+00 |
| A18: | 9.3960E+03 | −1.5928E+03 | 5.7120E+02 | 7.2034E+02 | 6.0138E+00 | −5.7177E+00 |
| A20: | −2.8780E+05 | −1.8899E+04 | 8.8877E+03 | 7.5237E+02 | −2.3698E+01 | 8.0522E+00 |

In the fifth embodiment, the curve equation of the aspheric surface profiles of the aforementioned lenses is the same as the curve equation of the first embodiment.

Also, the definitions of these parameters shown in the following table are the same as those stated in the first embodiment, so an explanation in this regard will not be provided again. Moreover, the values of these parameters can be calculated from Table 9 and Table 10, and the following conditions in the following table are satisfied.

| Embodiment 5 | | | |
|---|---|---|---|
| f[mm] | 0.56 | f1*f2/f3[mm] | 1.54 |
| EPD | 0.25 | (CT1 + CT2)/CT3 | 2.15 |
| Fno | 2.25 | TL/(IMH*2) | 2.85 |
| FOV[deg.] | 200.0 | BFL/IMH | 0.86 |
| HFOV*EPD/TL[deg.] | 5.00 | vd4-vd5 | 35.63 |
| CT5*R10[mm$^2$] | −0.30 | f*(R1/R2) [mm] | 3.47 |
| f/f1 | −0.39 | f4*f6/(CT4 + CT6) [mm] | 1.53 |
| f/f5 | −0.54 | R7/R8 | −1.37 |
| f2/f3 | −1.06 | f3*CT3/(f4*CT4) | 0.39 |
| f3/f4 | 2.37 | f/(f4*f5*f6)[mm$^{-2}$] | −0.34 |
| f5/f6 | −0.54 | | |

Sixth Embodiment

Figure 6:
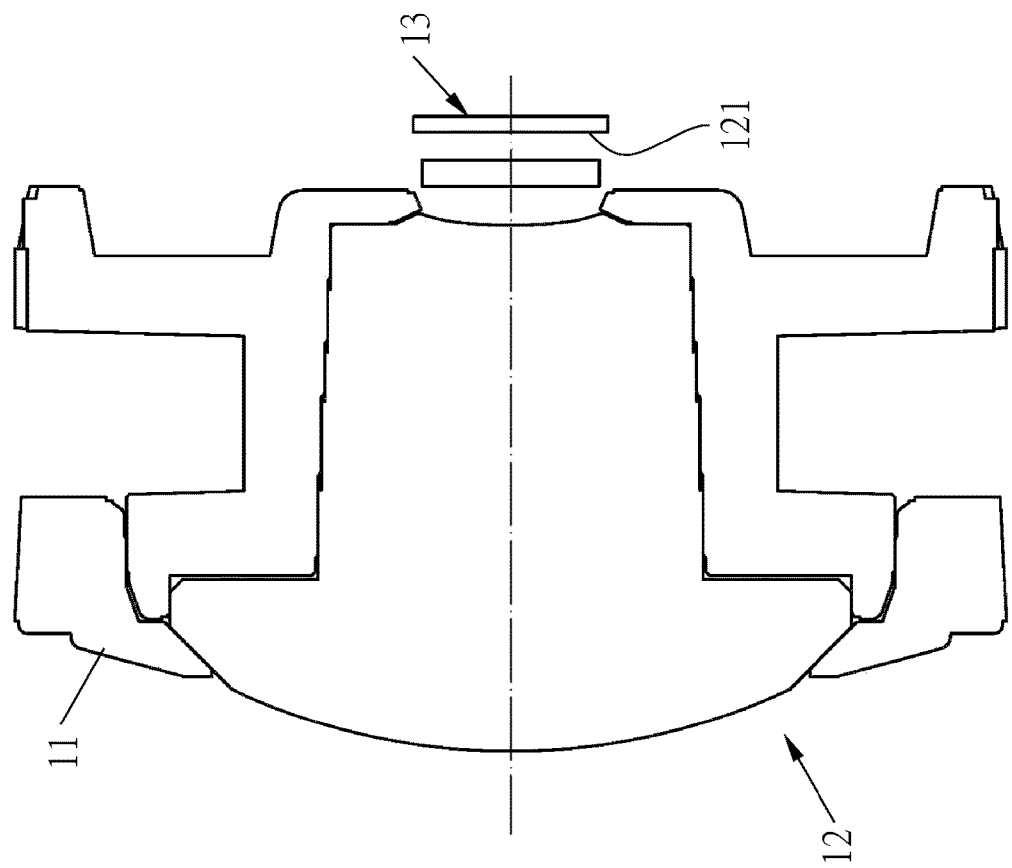
FIG. 6 shows a schematic view of a photographing module in accordance with a sixth embodiment of the present invention.

Referring to FIG. 6, which shows a schematic view of a photographing module in accordance with a sixth embodiment of the present invention. The photographing module 10 includes a lens barrel 11, an optical lens assembly 12 and an image sensor 13. The optical lens assembly 12 is the optical lens assembly of any one of the above embodiments. The optical lens assembly 12 is disposed in the lens barrel 11. The image sensor 13 is disposed on an image plane 121 of the optical lens assembly 12 and is an electronic image sensor (such as, CMOS or CCD) with good photosensitivity and low noise to really present the imaging quality of the optical lens assembly.

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly. Moreover, any of the object-side and image-side surfaces of a respective lens of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the optical lens assembly of the present invention, the filter is made of, but not limited to, glass and can be made of other materials with high Abbe numbers.

In the optical lens assembly of the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

The optical lens assembly of the present invention can be used in focus-adjustable optical systems according to the actual requirements and have good aberration correction ability and better image quality. The optical lens assembly of the present invention can also be used in electronic imaging systems, such as, 3D image capturing device, wearable display of virtual reality (VR) or augmented reality (AR), game player, surveillance camera, digital camera, mobile device, tablet computer or vehicle camera.

What is claimed is:

1. An optical lens assembly, in order from an object side to an image side, comprising:
    a first lens with negative refractive power, comprising an object-side surface and an image-side surface, the object-side surface of the first lens being convex in a paraxial region thereof, the image-side surface of the first lens being concave in a paraxial region thereof, and the first lens being made of glass;
    a second lens with negative refractive power, comprising an object-side surface and an image-side surface, the image-side surface of the second lens being concave in a paraxial region thereof, and one of the object-side surface and the image-side surface of the second lens being aspheric;
    a third lens with positive refractive power, comprising an object-side surface and an image-side surface, the image-side surface of the third lens being convex in a paraxial region thereof, and one of the object-side surface and the image-side surface of the third lens being aspheric;
    a stop;
    a fourth lens with positive refractive power, comprising an object-side surface and an image-side surface, the object-side surface of the fourth lens being convex in a paraxial region thereof, the image-side surface of the fourth lens being convex in a paraxial region thereof, and one of the object-side surface and the image-side surface of the fourth lens being aspheric;

a fifth lens with negative refractive power, comprising an object-side surface and an image-side surface, the object-side surface of the fifth lens being concave in a paraxial region thereof, the image-side surface of the fifth lens being convex in a paraxial region thereof, and one of the object-side surface and the image-side surface of the fifth lens being aspheric; and a sixth lens with positive refractive power, comprising an object-side surface and an image-side surface, the object-side surface of the sixth lens being convex in a paraxial region thereof, the image-side surface of the sixth lens being concave in a paraxial region thereof, and one of the object-side surface and the image-side surface of the sixth lens being aspheric;

wherein half of a maximum field of view of the optical lens assembly is HFOV, an entrance pupil diameter of the optical lens assembly is EPD, a distance from the object-side surface of the first lens to an image plane along an optical axis is TL, a central thickness of the fifth lens along the optical axis is CT5, a radius of curvature of the image-side surface of the fifth lens is R10, and following conditions are satisfied: 3.81 deg.<HFOV*EPD/TL<6.24 deg. and $-1.9$ mm$^2$<CT5*R10<$-0.2$ mm$^2$.

2. The optical lens assembly as claimed in claim 1, wherein a focal length of the optical lens assembly is f, a focal length of the first lens is f1, and a following condition is satisfied: $-0.46$<f/f1<$-0.09$.

3. The optical lens assembly as claimed in claim 1, wherein a focal length of the optical lens assembly is f, a focal length of the fifth lens is f5, and a following condition is satisfied: $-0.99$<f/f5<$-0.43$.

4. The optical lens assembly as claimed in claim 1, wherein a focal length of the first lens is f1, a focal length of the second lens is f2, a focal length of the third lens is f3, and a following condition is satisfied: 0.99 mm<f1*f2/f3<2.84 mm.

5. The optical lens assembly as claimed in claim 1, wherein a central thickness of the first lens along the optical axis is CT1, a central thickness of the second lens along the optical axis is CT2, a central thickness of the third lens along the optical axis is CT3, and a following condition is satisfied: 1.30<(CT1+CT2)/CT3<2.58.

6. The optical lens assembly as claimed in claim 1, wherein the distance from the object-side surface of the first lens to the image plane along the optical axis is TL, a maximum image height of the optical lens assembly is IMH, a the following condition is satisfied: 2.27<TL/(IMH*2)<3.56.

7. The optical lens assembly as claimed in claim 1, wherein a distance from the image-side surface of the sixth lens to the image plane along the optical axis is BFL, a maximum image height of the optical lens assembly is IMH, and a following condition is satisfied: 0.55<BFL/IMH<1.13.

8. The optical lens assembly as claimed in claim 1, wherein an Abbe number of the fourth lens is vd4, an Abbe number of the fifth lens is vd5, and a following condition is satisfied: 28.5<vd4−vd5<44.1.

9. The optical lens assembly as claimed in claim 1, wherein a focal length of the optical lens assembly is f, a radius of curvature of the object-side surface of the first lens is R1, a radius of curvature of the image-side surface of the first lens is R2, and a following condition is satisfied: 1.20 mm<f*(R1/R2)<4.16 mm.

10. The optical lens assembly as claimed in claim 1, wherein a focal length of the fourth lens is f4, a focal length of the sixth lens is f6, a central thickness of the fourth lens along the optical axis is CT4, a central thickness of the sixth lens along the optical axis is CT6, and a following condition is satisfied: 0.66 mm<f4*f6/(CT4+CT6)<1.89 mm.

11. The optical lens assembly as claimed in claim 1, wherein a radius of curvature of the object-side surface of the fourth lens is R7, a radius of curvature of the image-side surface of the fourth lens is R8, and a following condition is satisfied: $-2.20$<R7/R8<$-1.04$.

12. The optical lens assembly as claimed in claim 1, wherein a focal length of the third lens is f3, a focal length of the fourth lens is f4, a central thickness of the third lens along the optical axis is CT3, a central thickness of the fourth lens along the optical axis is CT4, and a following condition is satisfied: 0.22<f3*CT3/(f4*CT4)<0.48.

13. The optical lens assembly as claimed in claim 1, wherein a focal length of the optical lens assembly is f, a focal length of the fourth lens is f4, a focal length of the fifth lens is f5, a focal length of the sixth lens is f6, and a following condition is satisfied: $-1.19$ mm$^{-2}$<f/(f4*f5*f6)<$-0.27$ mm$^{-2}$.

14. A photographing module, comprising:

a lens barrel, an optical lens assembly disposed in the lens barrel, and an image sensor disposed on an image plane of the optical lens assembly, wherein the optical lens assembly, in order from an object side to an image side, comprising:

a first lens with negative refractive power, comprising an object-side surface and an image-side surface, the object-side surface of the first lens being convex in a paraxial region thereof, the image-side surface of the first lens being concave in a paraxial region thereof, and the first lens being made of glass;

a second lens with negative refractive power, comprising an object-side surface and an image-side surface, the image-side surface of the second lens being concave in a paraxial region thereof, and one of the object-side surface and the image-side surface of the second lens being aspheric;

a third lens with positive refractive power, comprising an object-side surface and an image-side surface, the image-side surface of the third lens being convex in a paraxial region thereof, and one of the object-side surface and the image-side surface of the third lens being aspheric;

a stop;

a fourth lens with positive refractive power, comprising an object-side surface and an image-side surface, the object-side surface of the fourth lens being convex in a paraxial region thereof, the image-side surface of the fourth lens being convex in a paraxial region thereof, and one of the object-side surface and the image-side surface of the fourth lens being aspheric;

a fifth lens with negative refractive power, comprising an object-side surface and an image-side surface, the object-side surface of the fifth lens being concave in a paraxial region thereof, the image-side surface of the fifth lens being convex in a paraxial region thereof, and one of the object-side surface and the image-side surface of the fifth lens being aspheric; and a sixth lens with positive refractive power, comprising an object-side surface and an image-side surface, the object-side surface of the sixth lens being convex in a paraxial region thereof, the image-side surface of the sixth lens being concave in a paraxial region thereof, and one of the object-side surface and the image-side surface of the sixth lens being aspheric; wherein half of a maximum field of view of the optical lens assembly is HFOV, an entrance pupil diameter of the optical lens assembly is EPD, a distance from the object-side surface of the first lens to an image plane along an optical axis is TL, a central thickness of the fifth lens along the optical axis is CT5, a radius of curvature of the image-side surface of the fifth lens is R10, and following conditions are satisfied: 3.81 deg.<HFOV*EPD/TL<6.24 deg. and −1.9 mm$^2$<CT5*R10<−0.2 mm$^2$.

15. The photographing module as claimed in claim 14, wherein a focal length of the optical lens assembly is f, a focal length of the fifth lens is f5, and a following condition is satisfied: −0.99<f/f5<−0.43.

16. The photographing module as claimed in claim 14, wherein a central thickness of the first lens along an optical axis is CT1, a central thickness of the second lens along the optical axis is CT2, a central thickness of the third lens along the optical axis is CT3, and a following condition is satisfied: 1.30<(CT1+CT2)/CT3<2.58.

17. The photographing module as claimed in claim 14, wherein a distance from the object-side surface of the first lens to the image plane along an optical axis is TL, a maximum image height of the optical lens assembly is IMH, and a following condition is satisfied: 2.27<TL/(IMH*2)<3.56.

18. The photographing module as claimed in claim 14, wherein a focal length of the optical lens assembly is f, a radius of curvature of the object-side surface of the first lens is R1, a radius of curvature of the image-side surface of the first lens is R2, and a following condition is satisfied: 1.20 mm<f*(R1/R2)<4.16 mm.

19. The photographing module as claimed in claim 14, wherein a focal length of the fourth lens is f4, a focal length of the sixth lens is f6, a central thickness of the fourth lens along an optical axis is CT4, a central thickness of the sixth lens along the optical axis is CT6, and a following condition is satisfied: 0.66 mm<f4*f6/(CT4+CT6)<1.89 mm.

20. The photographing module as claimed in claim 14, wherein a focal length of the third lens is f3, a focal length of the fourth lens is f4, a central thickness of the third lens along an optical axis is CT3, a central thickness of the fourth lens along the optical axis is CT4, and a following condition is satisfied: 0.22<f3*CT3/(f4*CT4)<0.48.

* * * * *